(12) United States Patent
Diepstraten et al.

(10) Patent No.: US 12,429,661 B2
(45) Date of Patent: Sep. 30, 2025

(54) LANYARDS FOR TELECOMMUNICATIONS EQUIPMENT INCLUDING PORTS AND MATING CONNECTORS

(71) Applicant: COMMSCOPE TECHNOLOGIES LLC, Hickory, NC (US)

(72) Inventors: Patrick Jacques Ann Diepstraten, Beringen (BE); Harry L. Vaswani, Garner, NC (US); Luis Carlos Mendoza, Chihuahua (MX)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 398 days.

(21) Appl. No.: 17/767,005

(22) PCT Filed: Oct. 8, 2020

(86) PCT No.: PCT/US2020/054816
§ 371 (c)(1),
(2) Date: Apr. 6, 2022

(87) PCT Pub. No.: WO2021/072100
PCT Pub. Date: Apr. 15, 2021

(65) Prior Publication Data
US 2022/0373746 A1 Nov. 24, 2022

Related U.S. Application Data

(60) Provisional application No. 62/913,051, filed on Oct. 9, 2019.

(51) Int. Cl.
*G02B 6/00* (2006.01)
*G02B 6/38* (2006.01)
*G02B 6/44* (2006.01)

(52) U.S. Cl.
CPC ......... *G02B 6/4472* (2013.01); *G02B 6/3849* (2013.01); *G02B 6/3895* (2013.01); *G02B 6/44775* (2023.05); *G02B 6/3897* (2013.01)

(58) Field of Classification Search
CPC .. G02B 6/3849; G02B 6/3895; G02B 6/3897; G02B 6/4444; G02B 6/00
See application file for complete search history.

(56) References Cited

U.S. PATENT DOCUMENTS 3,196,780 A  7/1965 Ternovits et al.
6,520,796 B1  2/2003 Reichle
(Continued)

FOREIGN PATENT DOCUMENTS

FR  2 551 688 A1  3/1985
KR  10-2008-0104107 A  12/2008
(Continued)

OTHER PUBLICATIONS

International Search Report and Written Opinion of the International Searching Authority for International Patent Application No. PCT/US2020/054816 mailed Jan. 29, 2021, 8 pages.
(Continued)

*Primary Examiner* — Jennifer Doan
(74) *Attorney, Agent, or Firm* — Merchant & Gould P.C.

(57) ABSTRACT

A telecommunications closure includes a plurality of connector ports, and a plurality of dust caps for the connector ports wherein a lanyard connects one of the dust caps with one of the ports. The dust caps are mateable and demateable with each of the ports. The closure with the dust caps in place are sealed for outdoor use. All of the port bodies of the ports have the same general color. All of the dust caps have the same general color as the port bodies. The lanyards may have different colors from the port bodies and different colors from the dust cap. Some lanyards can match the color (Continued)

of the port bodies and/or the dust cap bodies. At least two lanyards may have different colors from each other. One or more identification areas can be provided on the lanyard for labeling, printing or marking indicia on the identification areas.

21 Claims, 29 Drawing Sheets

(56) References Cited

U.S. PATENT DOCUMENTS

| | | | |
|---|---|---|---|
| 7,292,763 B2 | 11/2007 | Mertesdorf et al. | |
| 7,489,849 B2 | 2/2009 | Reagan et al. | |
| 7,734,138 B2 * | 6/2010 | Bloodworth | G02B 6/3897 385/86 |
| 7,744,288 B2 | 6/2010 | Lu et al. | |
| 9,557,498 B2 | 1/2017 | Loeffelholz | |
| 2007/0031103 A1 | 2/2007 | Tinucci et al. | |
| 2010/0129043 A1 | 5/2010 | Cooke et al. | |
| 2011/0229098 A1 | 9/2011 | Abernathy et al. | |
| 2011/0243640 A1 | 10/2011 | Bogert | |
| 2012/0088392 A1 | 4/2012 | Wagner | |
| 2013/0323949 A1 | 12/2013 | De Dios Martin et al. | |
| 2015/0260926 A1 | 9/2015 | Wu et al. | |
| 2019/0328119 A1 * | 10/2019 | Burnet | A45F 5/02 |

FOREIGN PATENT DOCUMENTS

| | | |
|---|---|---|
| KR | 10-2013-0023661 A | 3/2013 |
| WO | 2016/162377 A1 | 10/2016 |

OTHER PUBLICATIONS

DLX Adapter Split Dustcap Lanyard, CommScope, Inc., 1 page (Mar. 2, 2016).
Tether, Optitap Dust Cap, CommScope, Inc., 1 page (Jul. 5, 2018).
Extended European Search Report for Application No. 20873629.8 mailed Sep. 25, 2023.

* cited by examiner

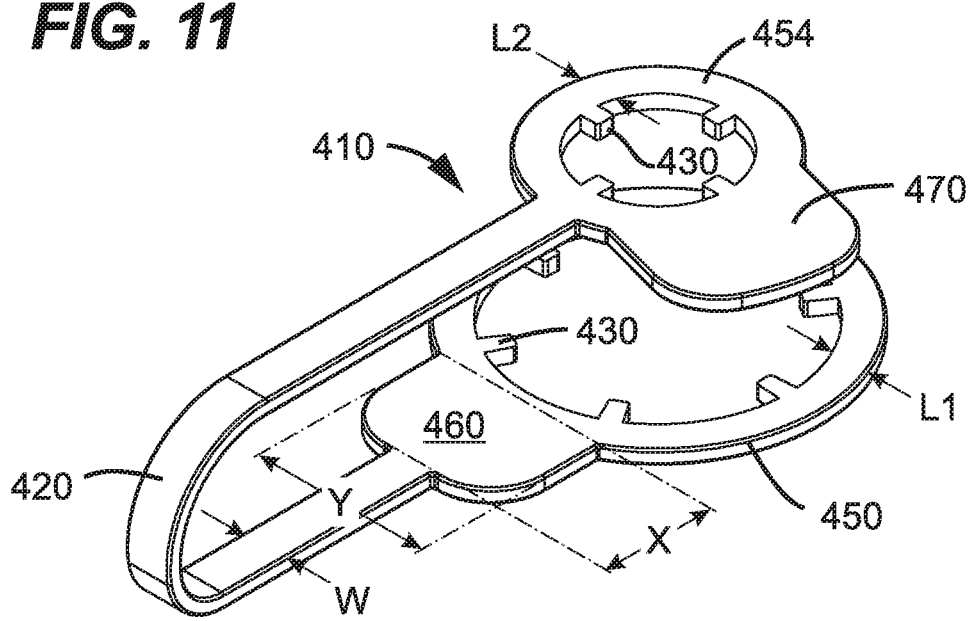
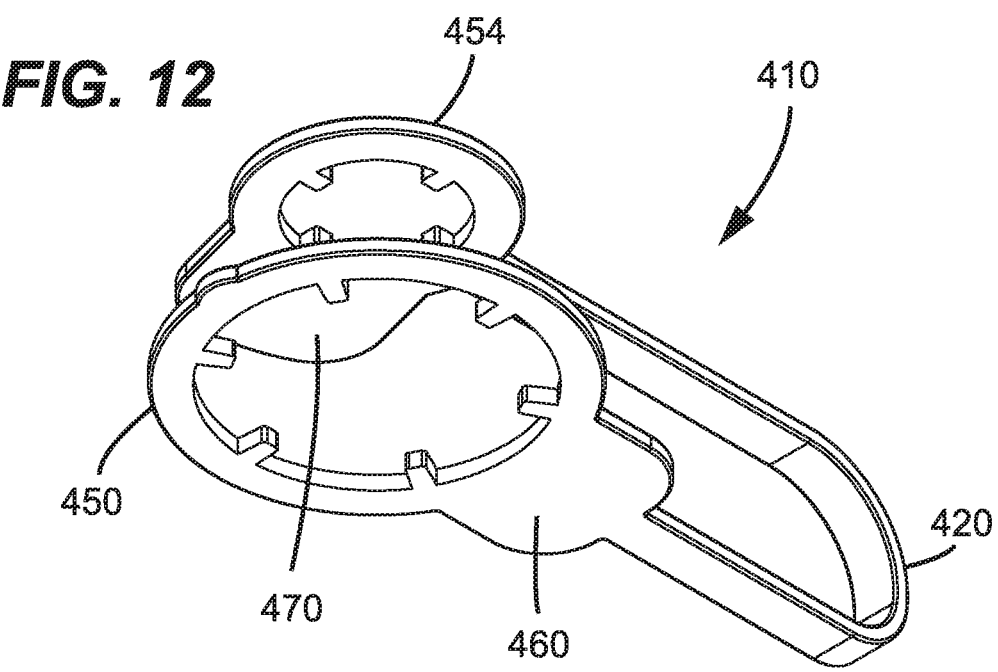

LANYARDS FOR TELECOMMUNICATIONS EQUIPMENT INCLUDING PORTS AND MATING CONNECTORS

CROSS-REFERENCE TO RELATED APPLICATION

This application is a National Stage Application of PCT/US2020/054816, filed on Oct. 8, 2020, which claims the benefit of U.S. Patent Application Ser. No. 62/913,051, filed on Oct. 9, 2019, the disclosures of which are incorporated herein by reference in their entireties. To the extent appropriate, a claim of priority is made to each of the above disclosed applications.

BACKGROUND

Telecommunications fiber optic networks are becoming prevalent in part because service provers want to deliver high bandwidth communications capabilities to customers. In some cases, the telecommunications equipment can be located outside in a form of a telecommunications closure or terminal which links incoming and outgoing cables. It is known to provide the telecommunications equipment with sealed ports for connecting to connectors which terminate to the ends of fiber optic cables. The connection between the port and the connector is generally deemed mateable and demateable as needed.

There is a need for identification devices, systems and methods to assist technicians who must mate cables with connectors to ports, and/or technicians that need to demate the cables with connectors and the ports.

SUMMARY

Aspects of the present disclosure relate to coding systems that facilitate efficiently and effectively deploying a fiber optic network. In certain examples, the coding system can include coded lanyards that link a telecommunications equipment port with a dust cap for the port or adapter. Typically the equipment port is for receipt of a fiber optic connector on the end of a cable, wherein the port includes a fiber optic adapter within the port for connecting to a second fiber optic connector within the closure or terminal In certain examples, the fiber optic connectors can also include a dust cap with a coded lanyard.

In certain examples, the fiber optic connectors and fiber optic ports or adapters can include hardened/ruggedized constructions for outdoor environmental use. In certain examples, the connectors, adapters, and dust caps can include twist-to-lock interfaces.

In certain examples, the connecting lanyards can include identifying indicia such as identifying colors, identifying markings, identifying shapes, identifying letters, identifying symbols, identifying numbers or the like. In certain examples, the identifying indicia on the lanyards can be coordinated between optical components intended to be coupled together so that an installer in the field can readily recognize and identify which components should be coupled together.

A variety of additional aspects will be set forth in the description that follows. These aspects can relate to individual features and to combinations of features. It is understood that the foregoing general description and the following detail description are exemplary and explanatory only and are not restrictive of the broad concepts which the embodiments disclosed herein are based.

BRIEF DESCRIPTION OF THE DRAWINGS

The accompanying drawings, which are incorporated and constitute a part of the specification, illustrates several aspects of the present disclosure and together with the description, service to explain the principles of the disclosure. A brief description of the drawings is as follows:

FIG. 11 is a first alternative lanyard to the lanyards shown in FIGS. 1-10;

FIG. 12 is a bottom perspective view of the lanyard of FIG. 11;

DETAILED DESCRIPTION

Figure 1:
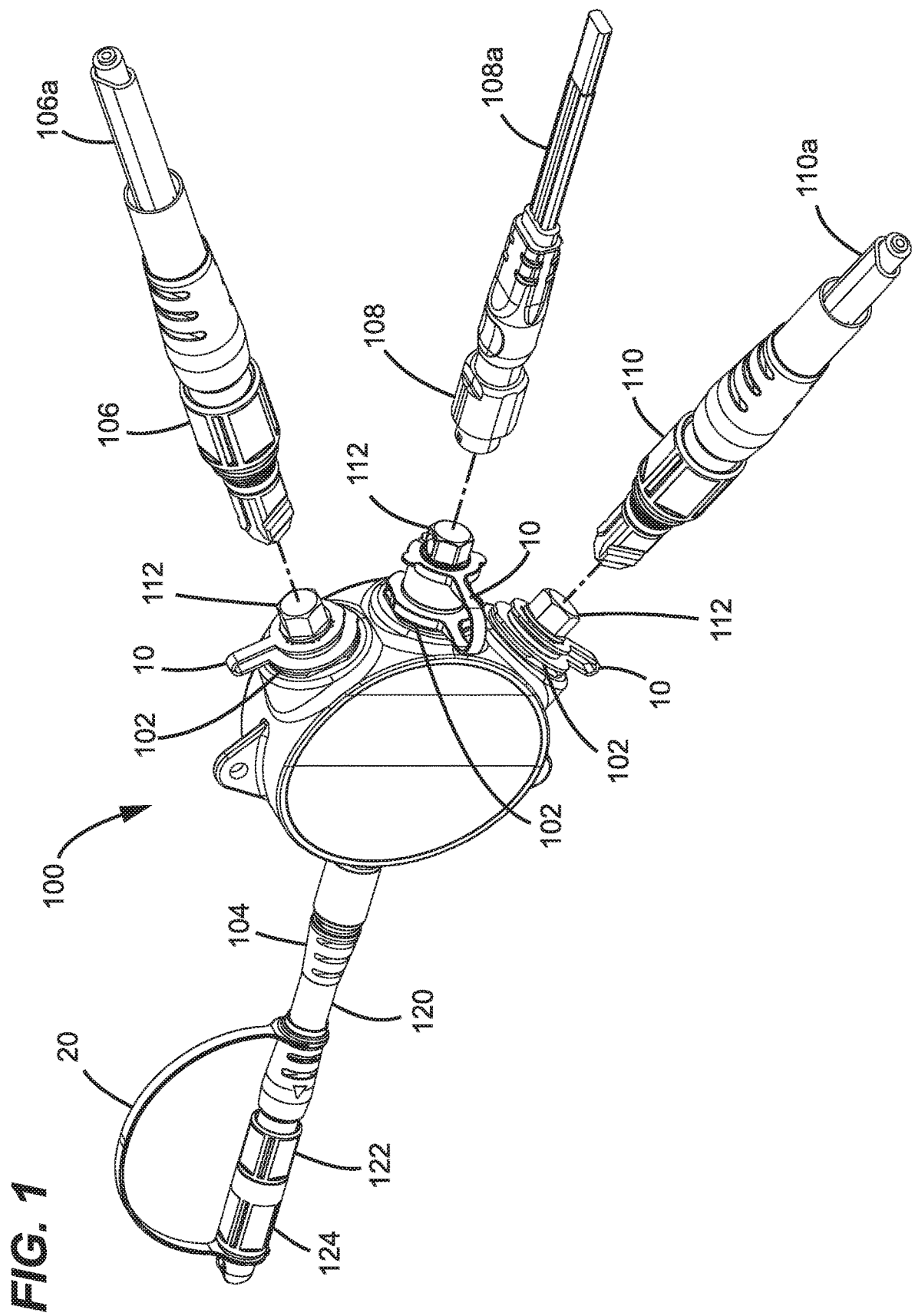
FIG. 1 is a perspective view of a first terminal housing or closure where dust caps are retained with lanyards at the ports of the terminal and where a dust cap is retained on a connector on a cable extending from the terminal.
Figure 2:
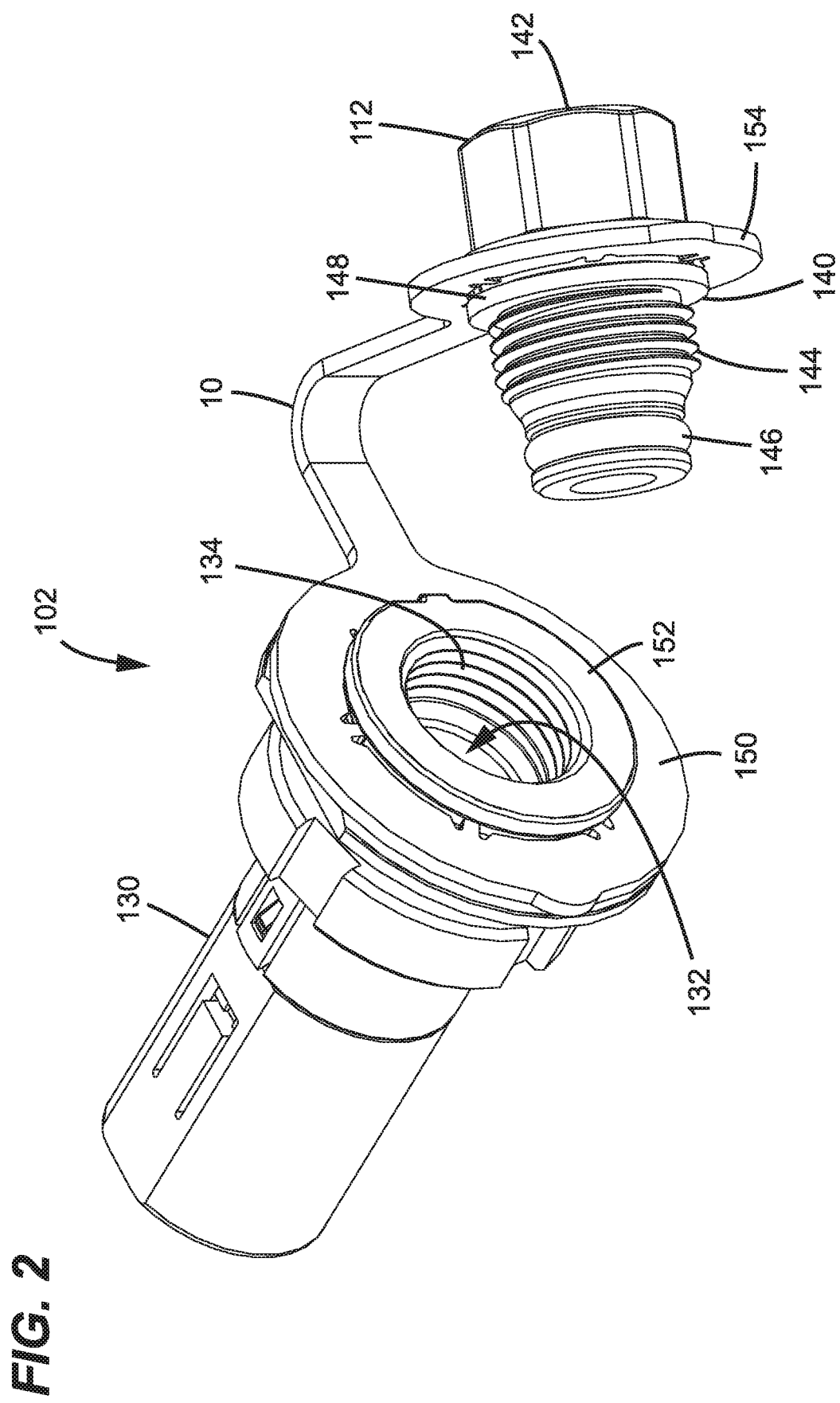
FIG. 2 is a perspective view of a hardened fiber optic port of a FIG. 1 and a dust cap and a lanyard.

Referring now to FIGS. 1-10, various telecommunications closures (terminals), cables, connectors, and ports (adapters) and dust caps are shown. In the illustrated examples, the closures are typically sealed from dirt, dust, and water, and are suitable for outdoor use. The adapters, in the form of ports on the exterior of the closures are sealed with a dust cap before connection to a connector of a cable. The port and connector interface is also sealed once the port and the connector are connected together. For example, O-ring seals on the dust caps and the connectors can be used at the ports. Also, the connectors are also protected with a sealed dust cap in some examples.

In the case of a terminal or closure having a sealed port, a mating dust cap is provided. A lanyard is used to connect the dust cap to the port so that when the dust cap is removed, the dust cap stays near the port. At some later time, the same dust cap can be reinserted into the port to reseal the port. Similarly, if a connector is sealed with a dust cap, the connector dust cap is also connected to the connector with a lanyard. In some cases when a connector and a port are connected together, the connection is sealed. The connection is demateable if changes in the connectivity of the telecommunications system are needed. Also, the dust cap of the connector and the dust cap of the port can be intermated to keep each element clean, such as for future sealing of the connector and/or the port. By sealed in this disclosure, it generally means protected from dust, dirt, water or damage.

Port identification on closures is important. Typically, the closures have multiple ports and there is a need to identify and distinguish between the different ports for proper connection or disconnection by the technician who is making connections and disconnections for each of the ports. The identification can take the form of a port number, an identification of what kind of port (a forward feed, or a reverse feed, to indicate unused ports), no internal connection to the port, to mark which customers, such as house numbers, are connected to the port, or to mark a tap value in case of a port use for tapping of a signal for port testing or monitoring.

The identification or coding systems that use coded lanyards help facilitate efficient and effective deployment of a fiber optic network. In certain examples the lanyards can use identifying indicia such as identifying colors, identifying markings, identifying shapes, identifying letters, identifying symbols, identifying numbers or the like.

In certain examples, the identifying indicia can be coordinated between the optical components intended to be coupled together so that an installer in the field can readily recognize and identify which components should be coupled together.

In a case of a lanyard, the lanyard is intended to stay connected to the port on one end, and the dust cap on the other end. A visual indicator, such as a color can be seen from a significant distance by the technician who is not immediately next to the closure. For example, the closure can be twenty feet in the air on a pole. Similarly, a lanyard associated with a connector and a mating dust cap of the connector can be readily identified, such as by color, if the closure with the connector connected to a port is spaced a distance from the technician.

Referring now to FIG. 1, a telecommunications closure 100 is shown having three ports 102 and a tether 104. Each port 102 can be identical, or it can be of a different style and size relative to the other ports. Similarly, the mating connectors 106, 108, 110 are sized for receipt in a respective port 102. Each connector 106, 108, 110 terminates a cable 106a, 108a, 110a. Each port 102 includes a dust cap 112. The dust cap 112 is demateable from the respective port 102. Each dust cap 112 is maintained near port 102 by lanyard 10. The lanyard 10 has one end which holds or maintains connection to the dust cap, and an opposite end which holds or maintains connection with the port. Connectors 106, 108, 110 are shown without protective dust caps or lanyards. However, as will be described below, each of these connectors 106, 108, 110 can have a protective dust cap help by a lanyard 20.

Tether 104 includes a cable 120, a connector 122 and a dust cap 124. Dust cap 124 is maintained with connector 122 when the dust cap 124 is removed from an end of the connector 122 by lanyard 20.

These lanyards 10, 20 for the ports (or adapters) 102 or for the connector 122 can be provided with indicia to distinguish the ports from one group or from one another and the connectors from one group or from one another. One useful indicia is the use of a different color. Using the colored lanyards for identification purposes removes the need to colorize the dust caps, the ports, or the connectors. Many of these parts are molded, and to offer colorized versions can complicate manufacture and use. Adding a coloring agent to plastic parts can give the molded plastic parts different properties which could affect performance, such as sealing with other components or longevity in the field under various sunlight or weather conditions. Also, colorized dust caps, ports, and connectors require that different colored parts be manufactured, stocked and monitored for distribution, sales, and implementation in the field so that the desired colors are always available at the desired time. If the ports, dust caps, and connectors are all similar colors to each other, none of these problems exist.

Two portions of a ruggedized port are shown including a port body 130 defining a socket portion 132, and threads 134. Dust cap 112 includes a plug body 140 having an external end 142 and a threaded opposite end 144. A seal 146 is utilize to help seal, such as an O-ring, in some implementations.

Lanyard 10 includes a first end 150 in the form of a loop. A second end 154 is also in the form of a loop. Each of loops 150, 154 are pressed over flanges 152, 148 so as to retain the respective first end and second end 150, 140 of lanyard 10 so that dust cap 112 is retained with port body 130. Other constructions besides full loops are possible, including open loops.

Figure 3:
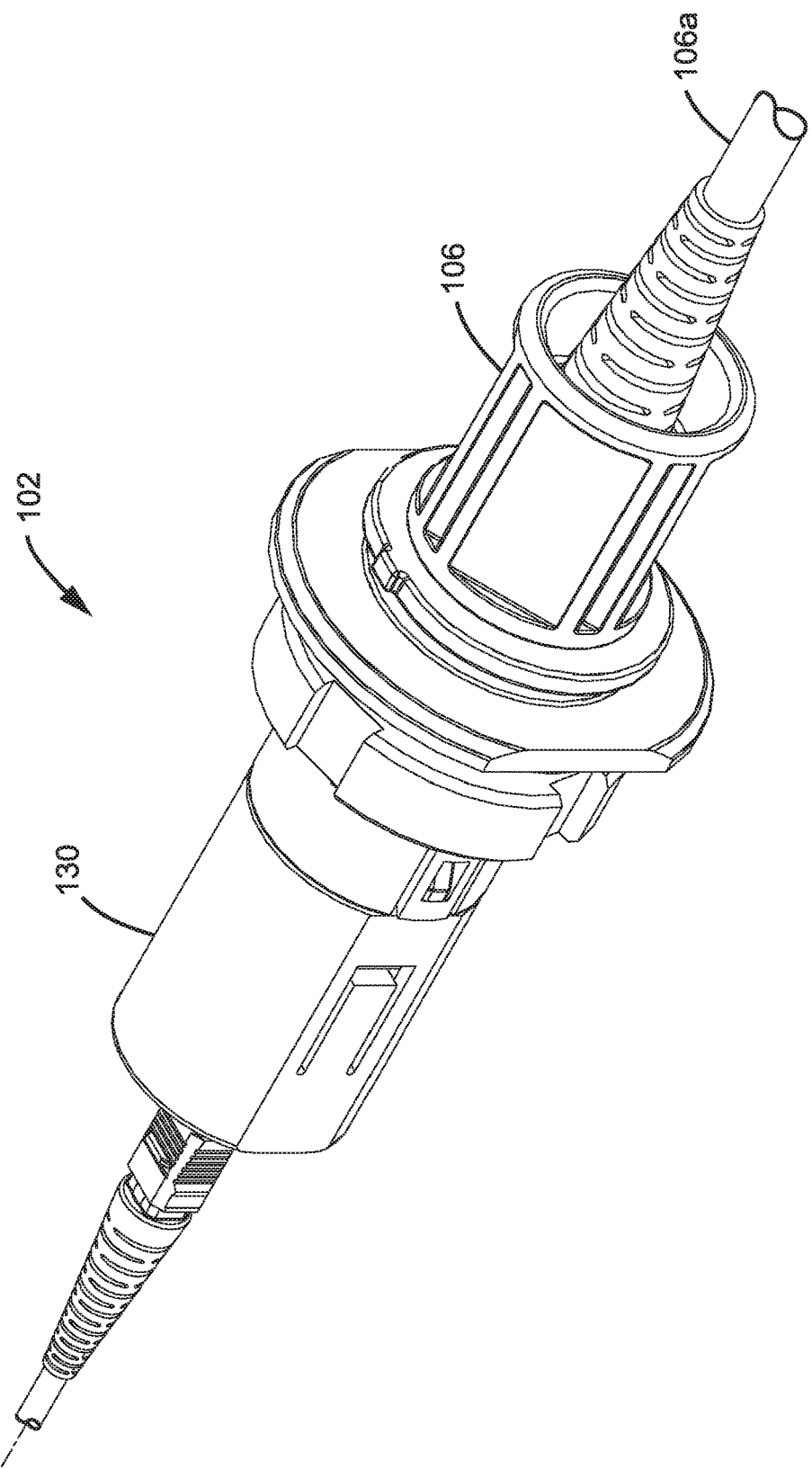
FIG. 3 is a perspective view of a fiber optic connector connected to the port of FIG. 2 wherein the dust cap and lanyard are removed.

FIG. 3 shows a further view of port 102 with a mating connector 106.

Figure 4:
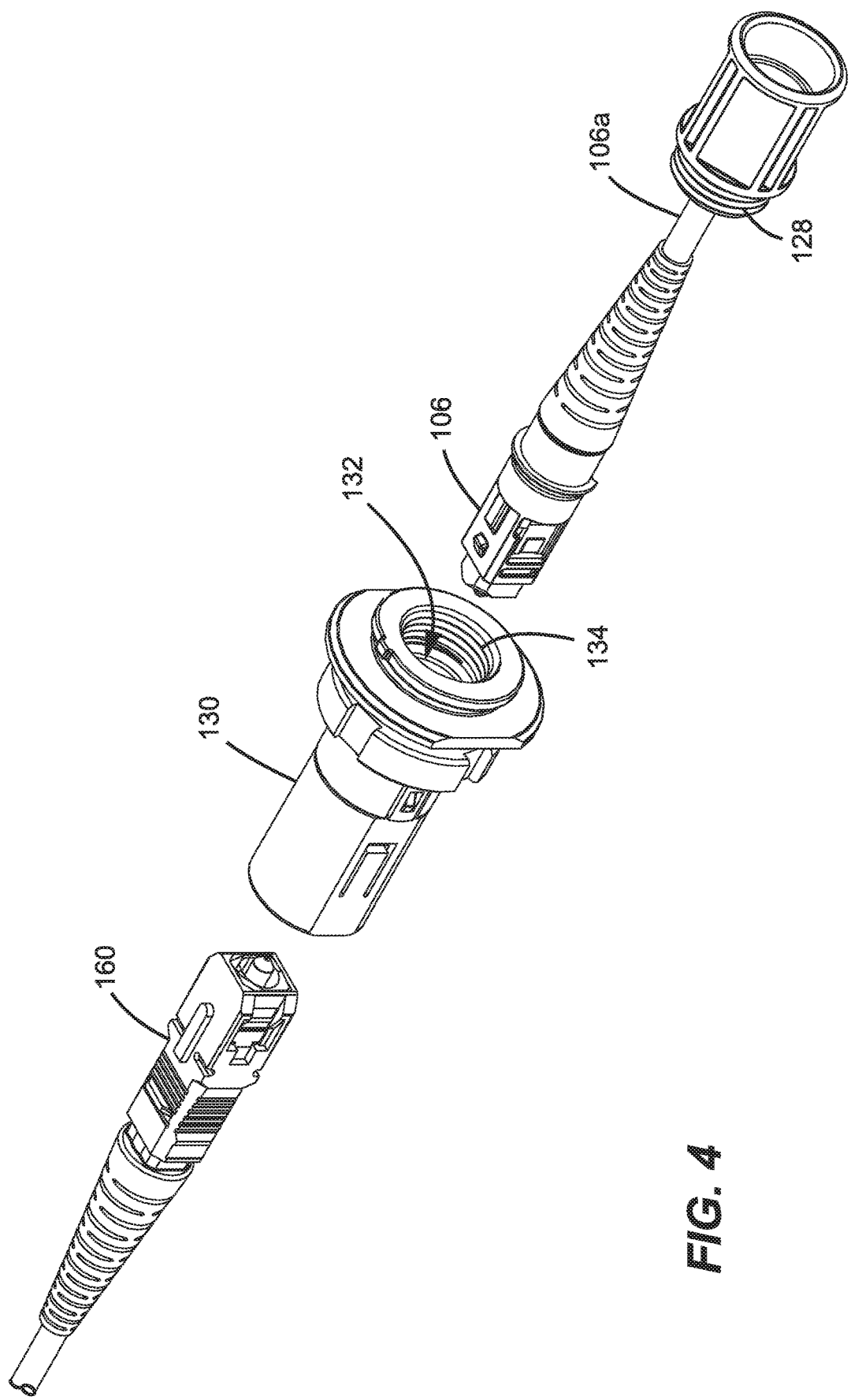
FIG. 4 is a perspective view of the example fiber optic connection system of FIG. 3 with the inner SC connector disconnected from the hardened part of the fiber optic adapter.

FIG. 4 shows an exploded view of an internal connector 160, the external connector 106 and the port body 130.

Figure 5:
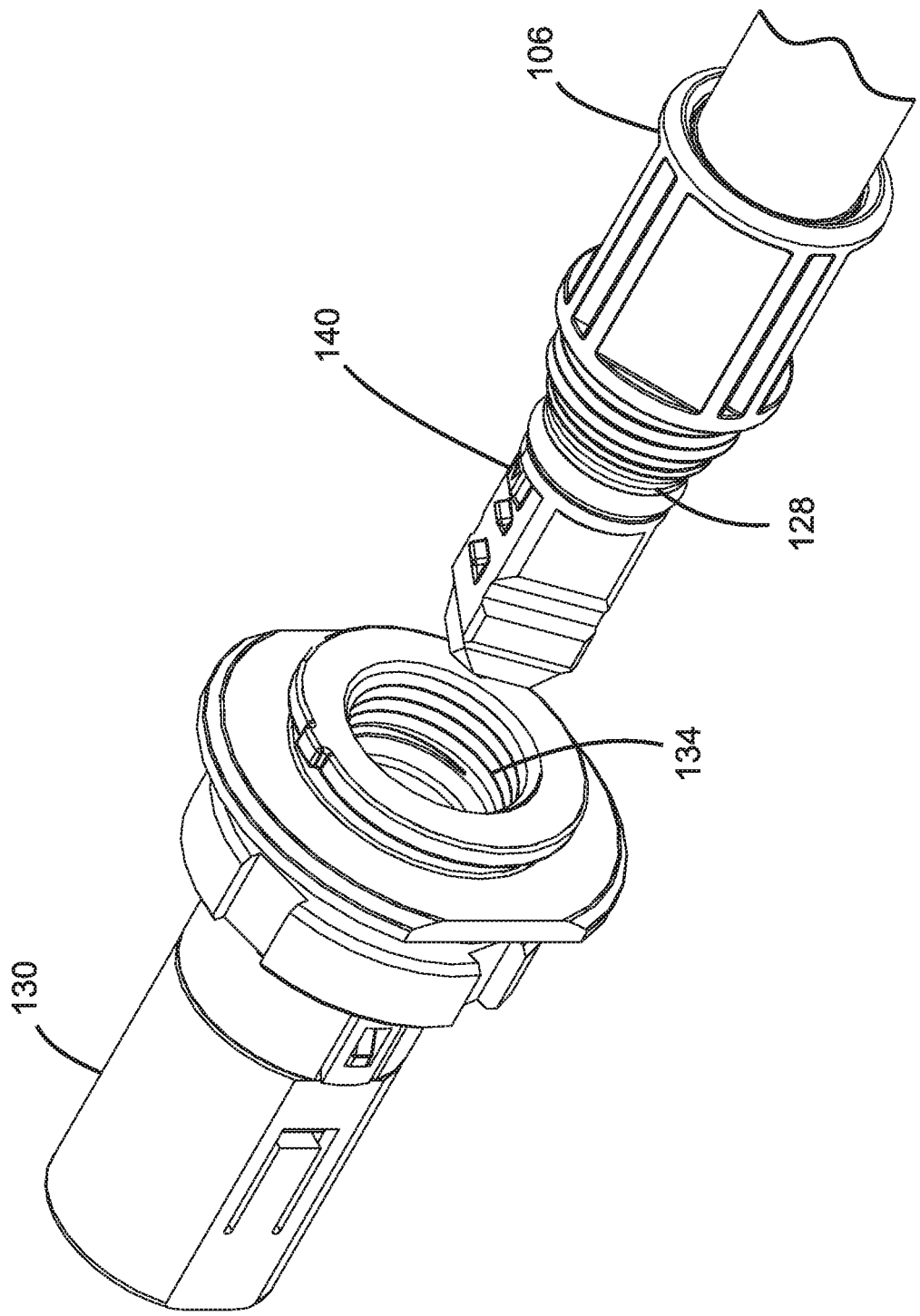
FIG. 5 is a perspective view of portions of the hardened connector and port of FIG. 4.

FIG. 5 shows another port body 130 and another plug body 140 for connector 106.

Figure 6:
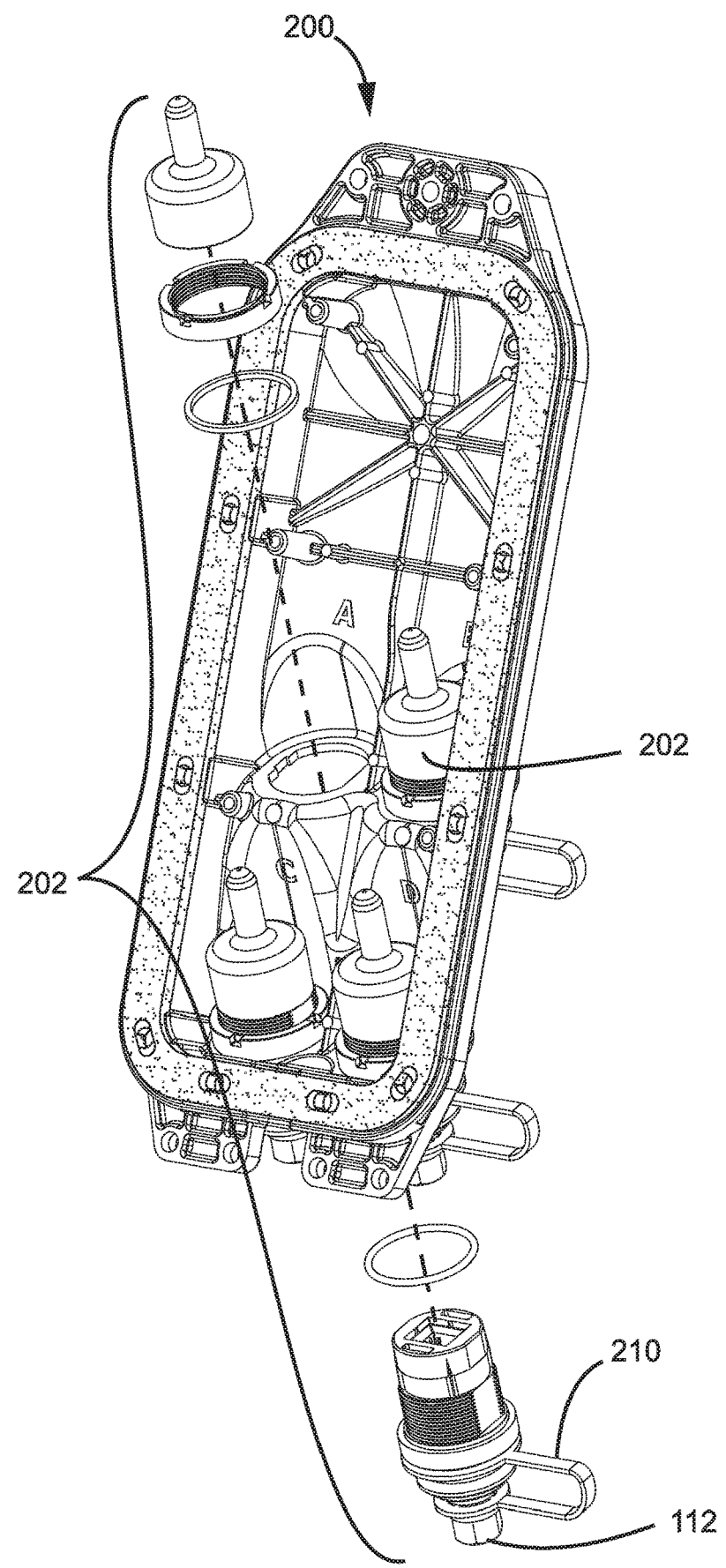
FIG. 6 is an exploded perspective view of another terminal showing the hardened fiber optic port, a lanyard, and a dust cap in exploded view.

FIG. 6 shows a different closure 200 having four hardened ports 202 each hardened port includes a lanyard, wherein the base has been removed to show the interior.

Figure 7:
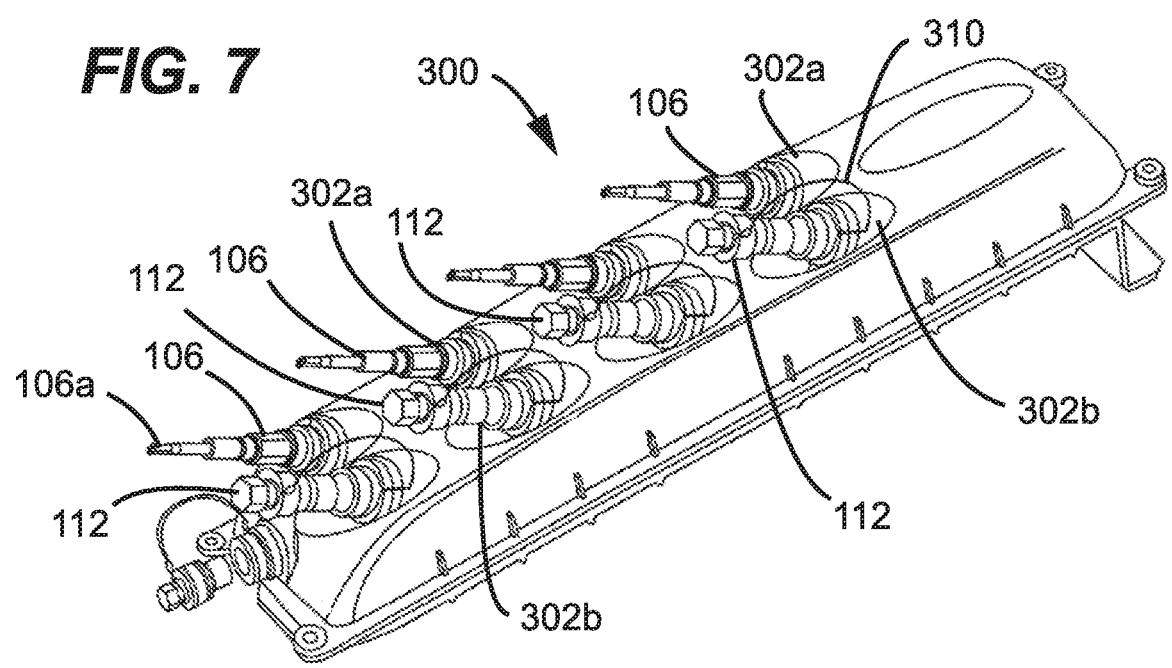
FIG. 7 is a perspective view of another telecommunications terminal, wherein certain ports are connected to fiber optic connectors, and other ports are sealed with dust caps including a retaining lanyards.

FIG. 7 shows another closure 300 wherein some of the ports 302a are connected to connectors and other ports 302b are protected by dust caps 112 each connected by a lanyard 310 shown schematically.

Figure 8:
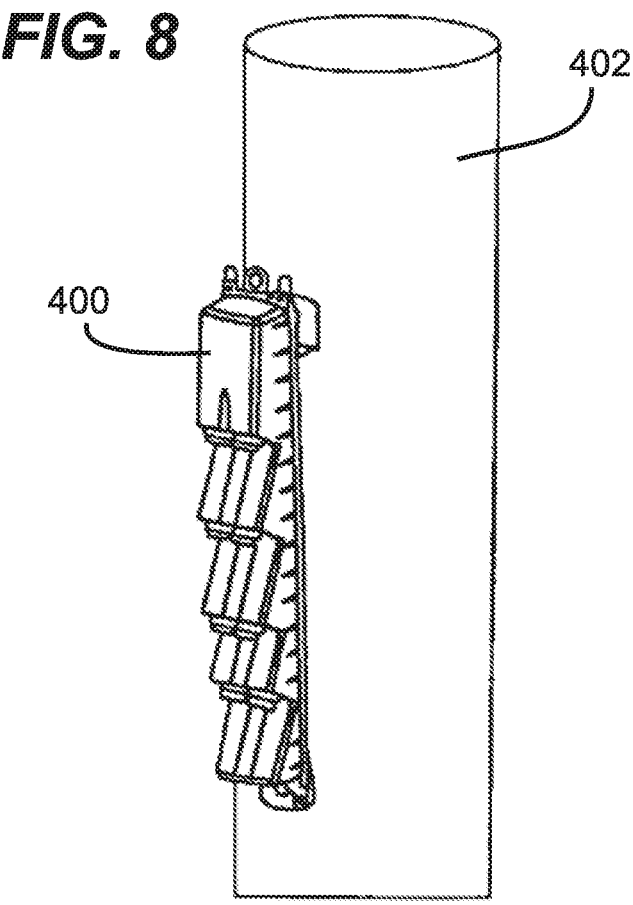
FIG. 8 shows an example telecommunications terminal mounted on a pole which extends above the ground.

FIG. 8 shows a closure 400 mounted on a pole 402 which is above the ground and not easy to access by a technician, except through a ladder or cherry (basket crane) picker device. Colored indicia on the lanyards can assist the technician with properly identifying ports from a distance, and possibly identifying different closures based on the identified ports through the colorized lanyards. The colored indicia can save time and/or prevent errors by the technician.

Figure 9:
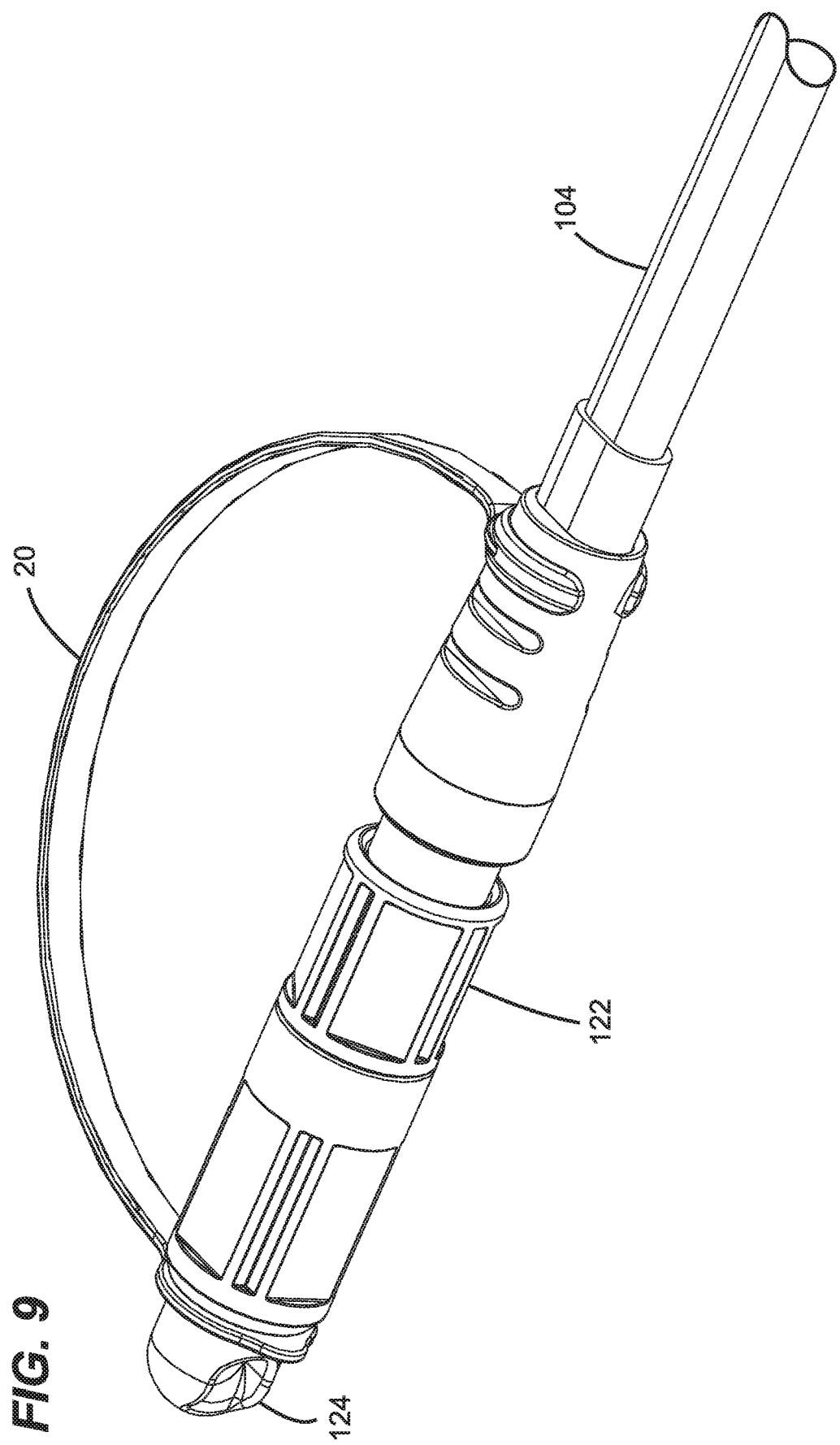
FIG. 9 is a perspective view of a telecommunications cable and a hardened connector sealed by a dust cap wherein the dust cap is retained by a lanyard.

FIG. 9 shows in more detail an example connector 122 and a dust cap 124 connected by lanyard 20.

Figure 10:
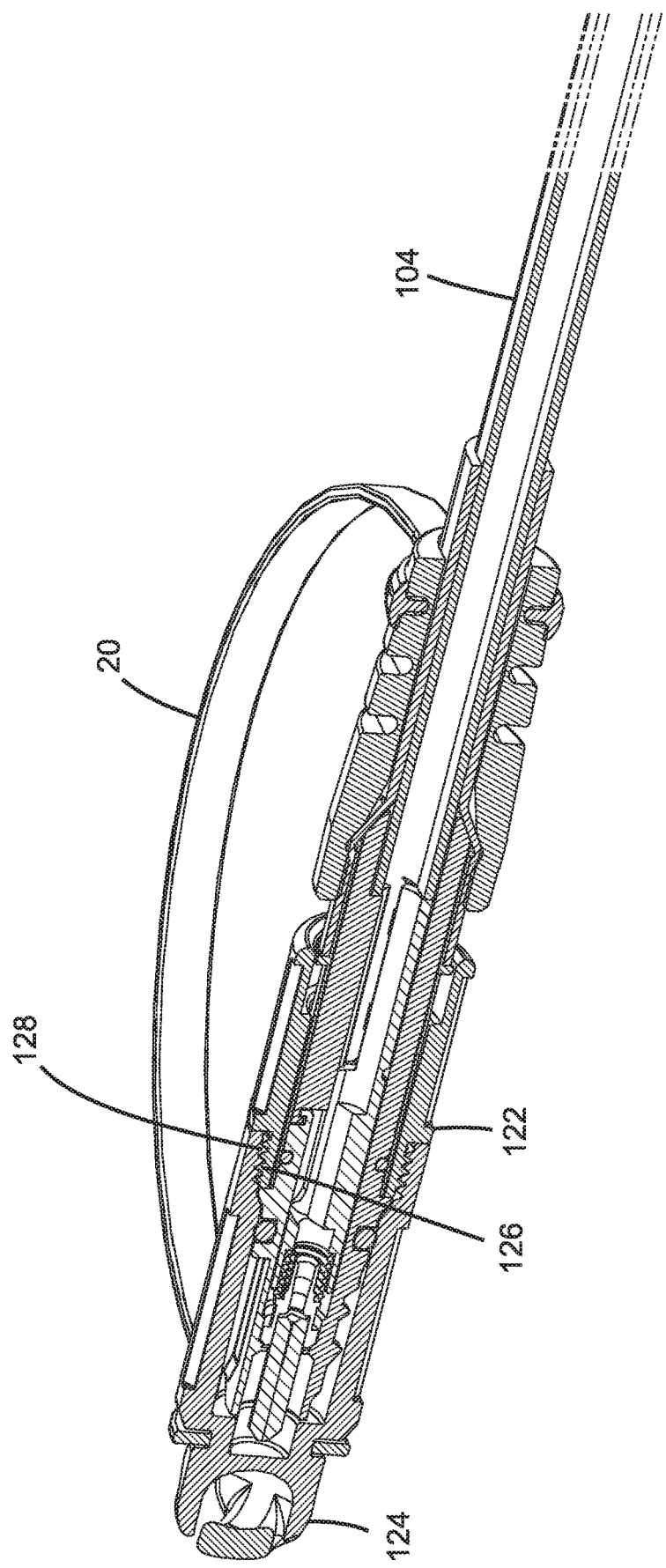
FIG. 10 is a cross-sectional view of the telecommunications cable, connector, and dust cap including the retaining lanyard of FIG. 9.
Figure 13:
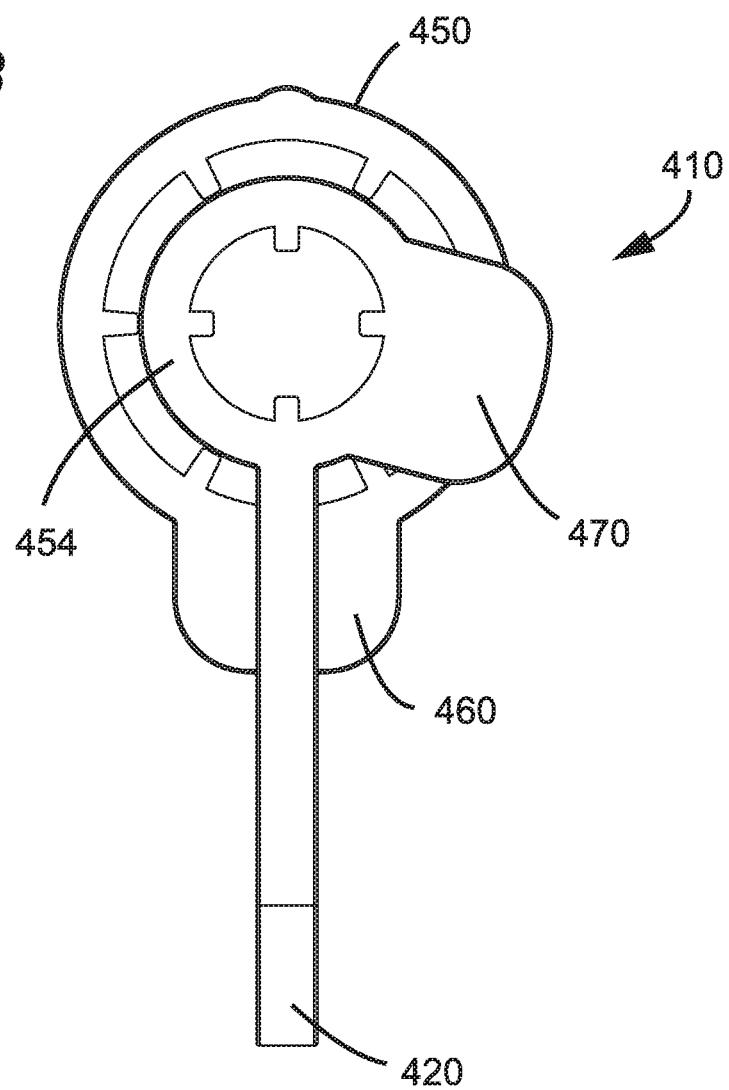
FIG. 13 is a top view of the lanyard of FIG. 11.
Figure 14:
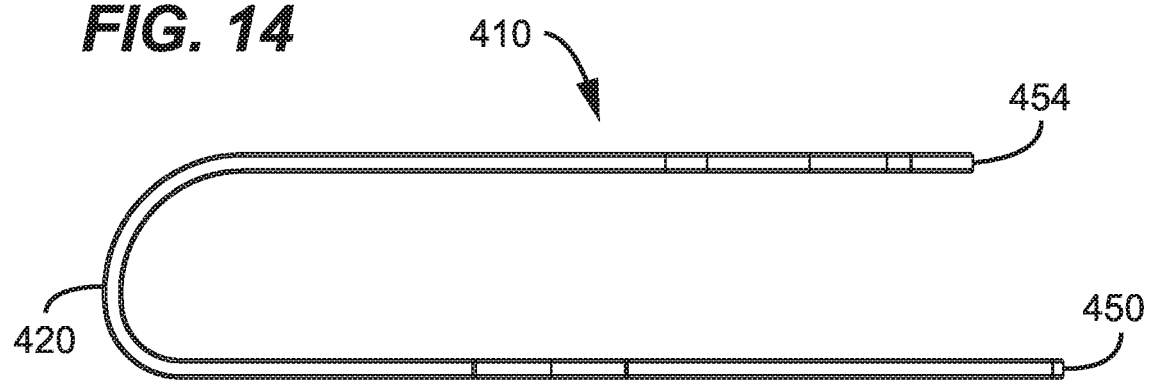
FIG. 14 is a side view of the lanyard of FIG. 11.
Figure 15:
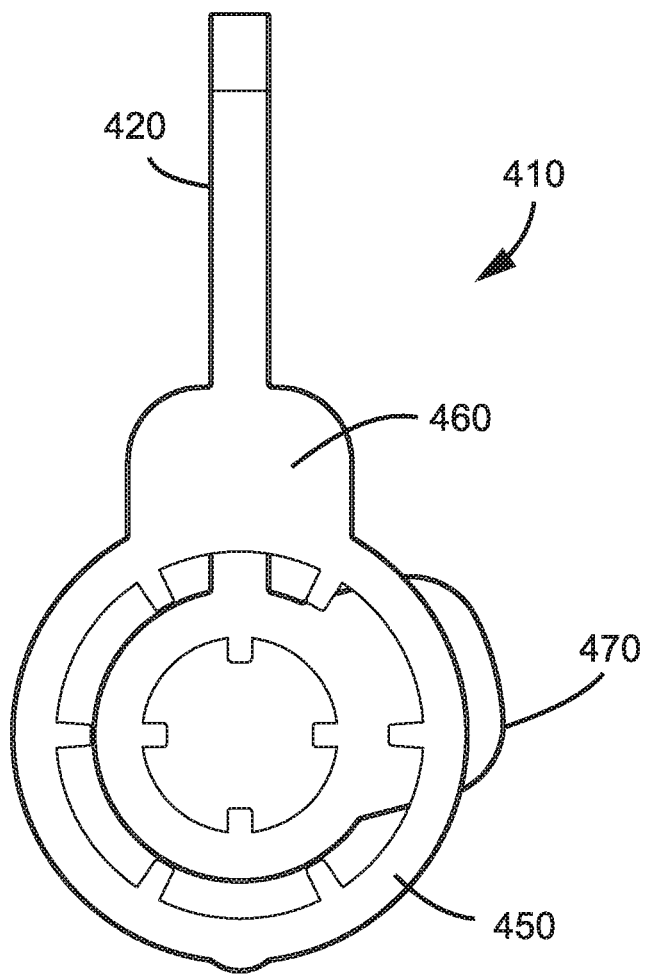
FIG. 15 is a bottom view of the lanyard of FIG. 11.
Figure 16:
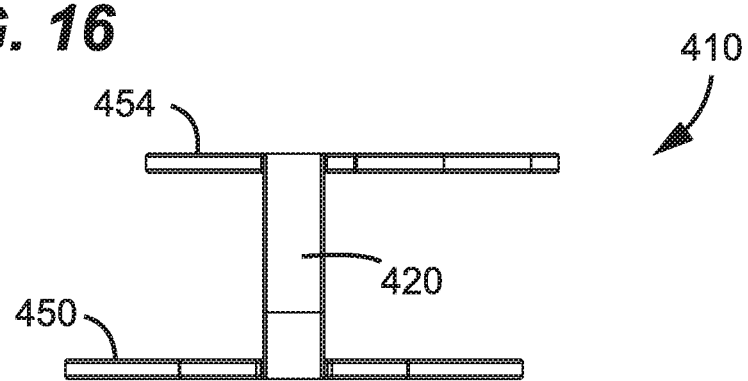
FIG. 16 is an end view of the lanyard of FIG. 11.
Figure 17:
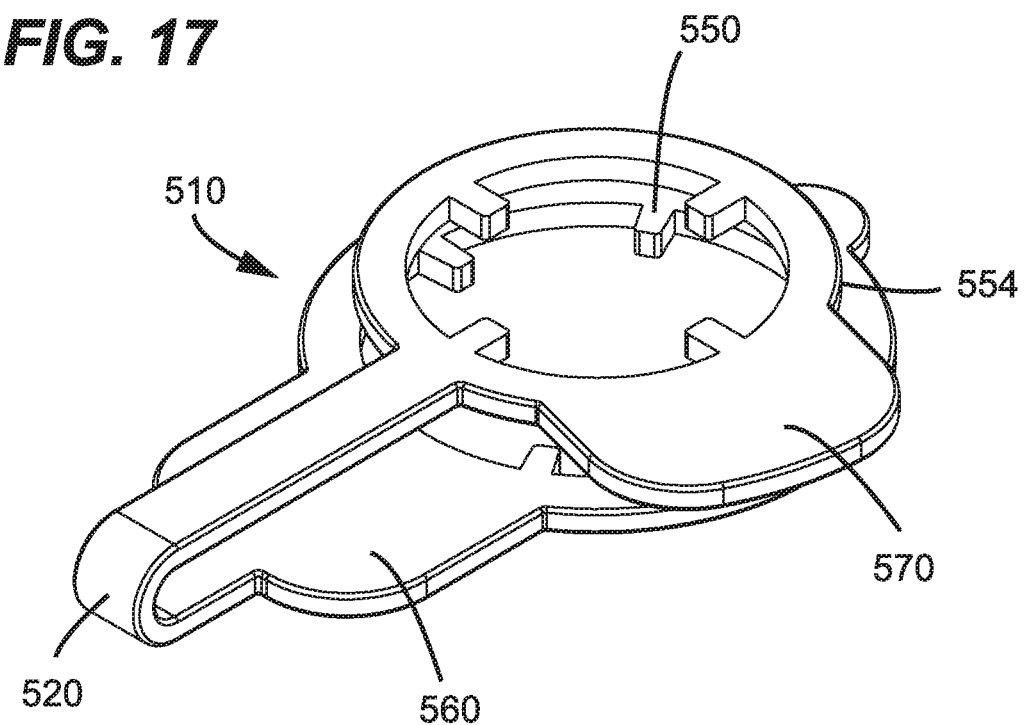
FIG. 17 is a top perspective view of a second alternative lanyard.
Figure 18:
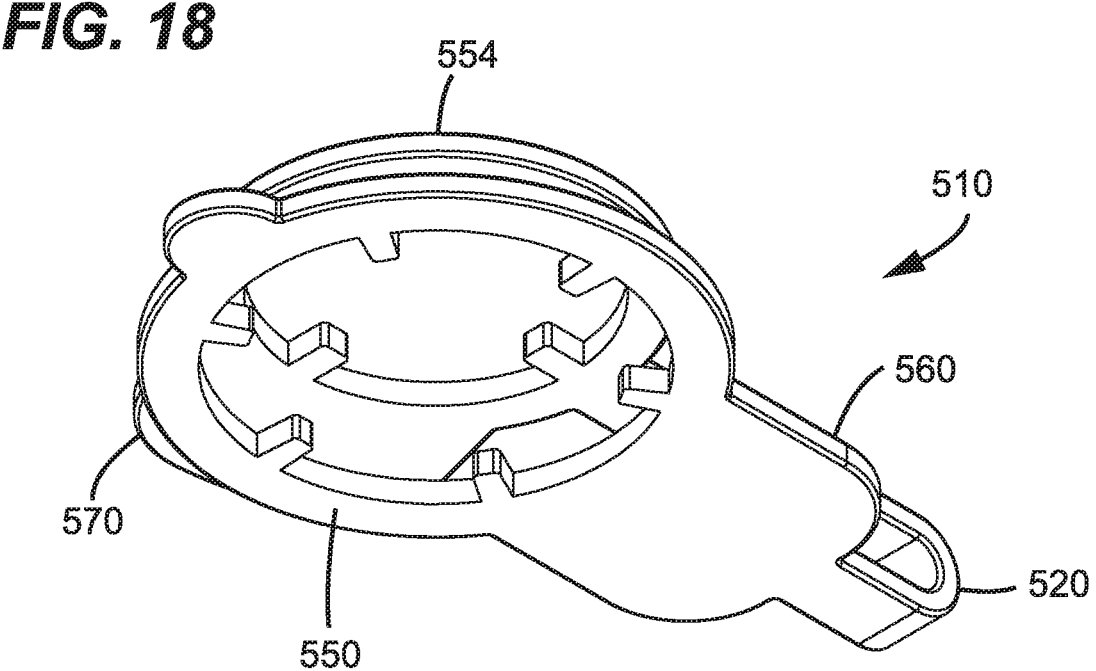
FIG. 18 is a bottom perspective view of the lanyard of FIG. 17.
Figure 19:
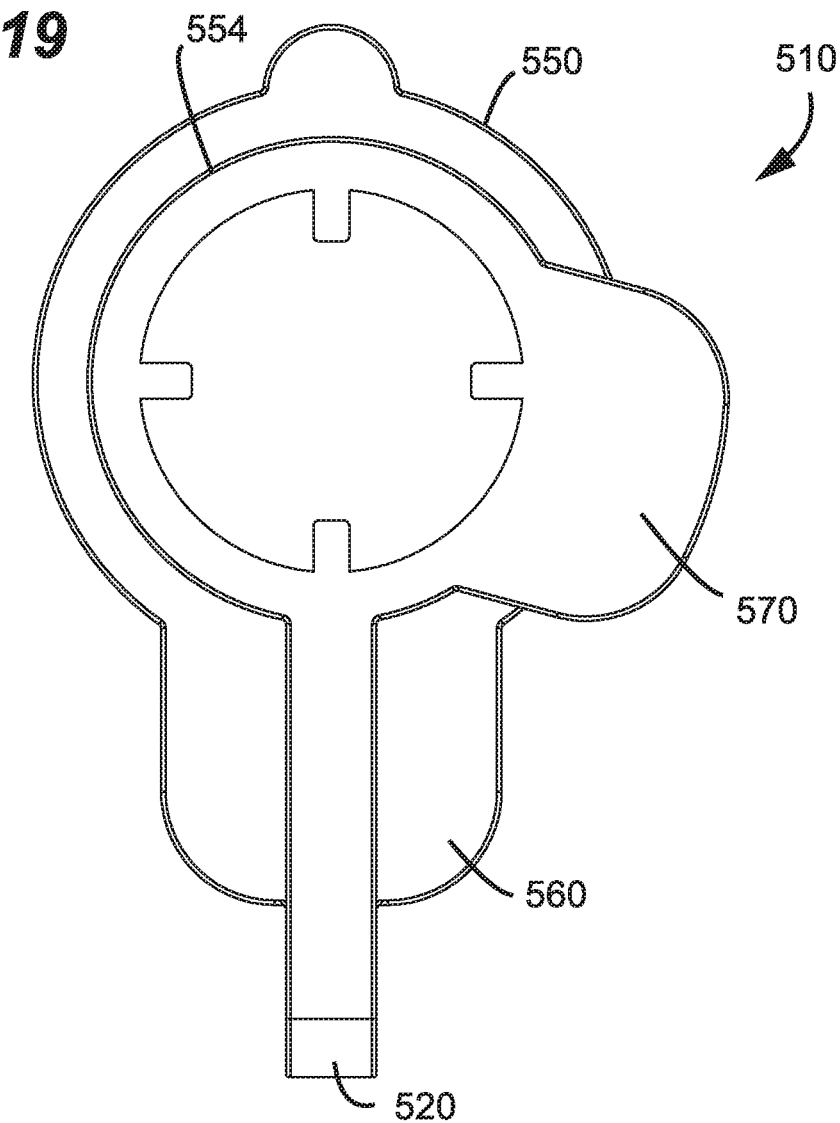
FIG. 19 is a top view of the lanyard of FIG. 17.
Figure 20:
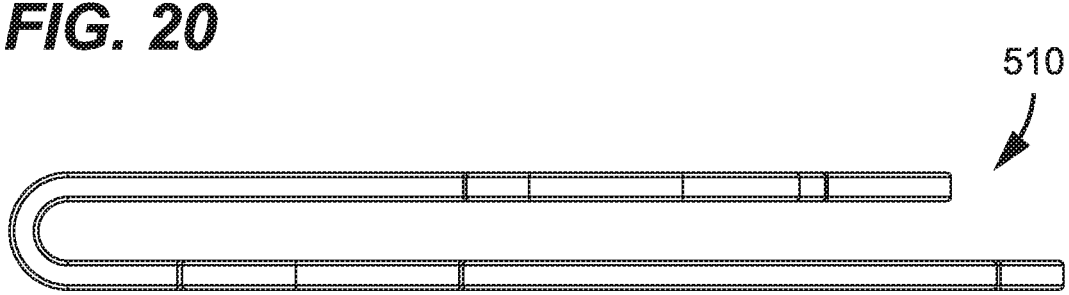
FIG. 20 is a side view of the lanyard of FIG. 17.
Figure 21:
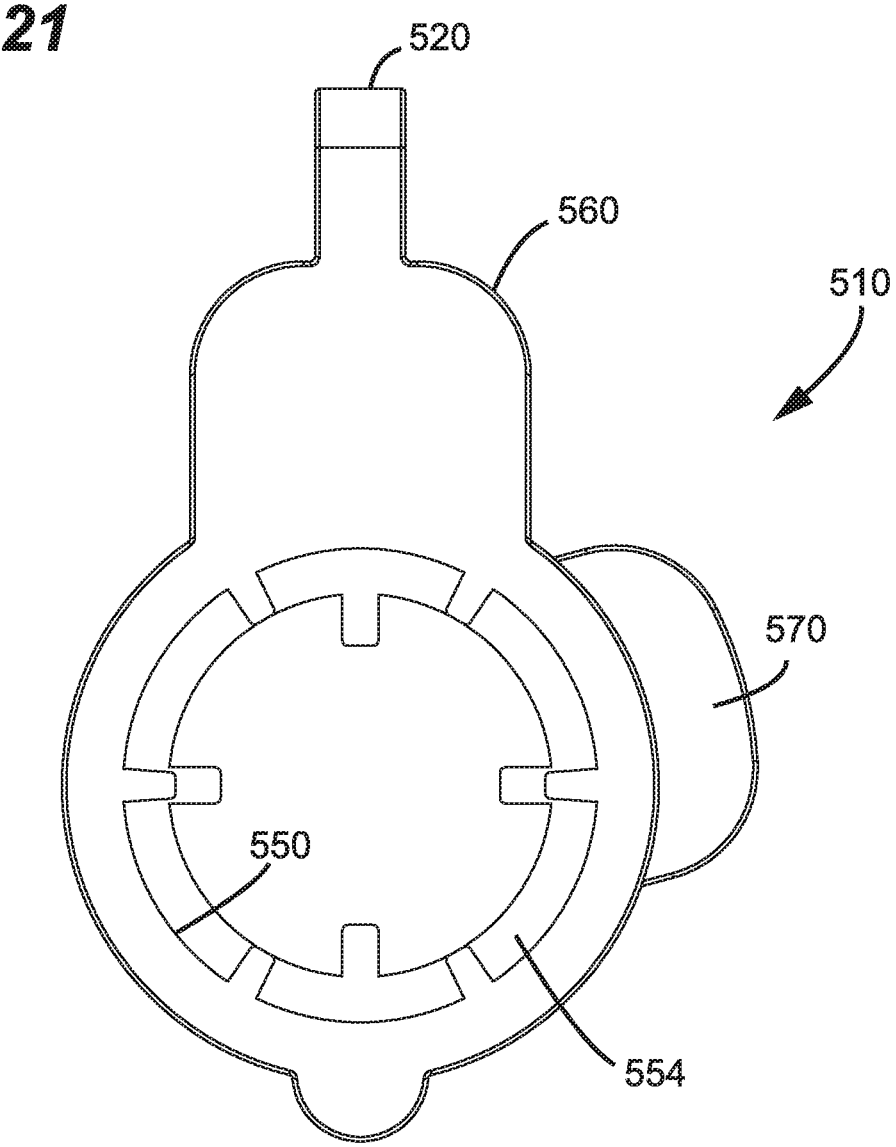
FIG. 21 is a bottom view of the lanyard of FIG. 17.
Figure 22:
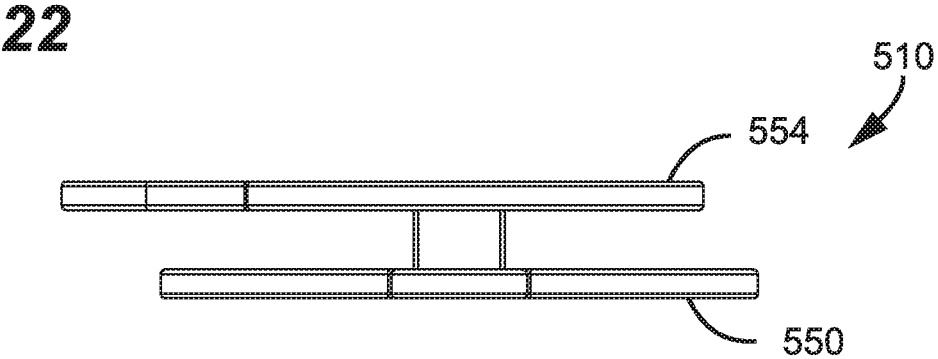
FIG. 22 is an end view of the lanyard of FIG. 17.
Figure 23:
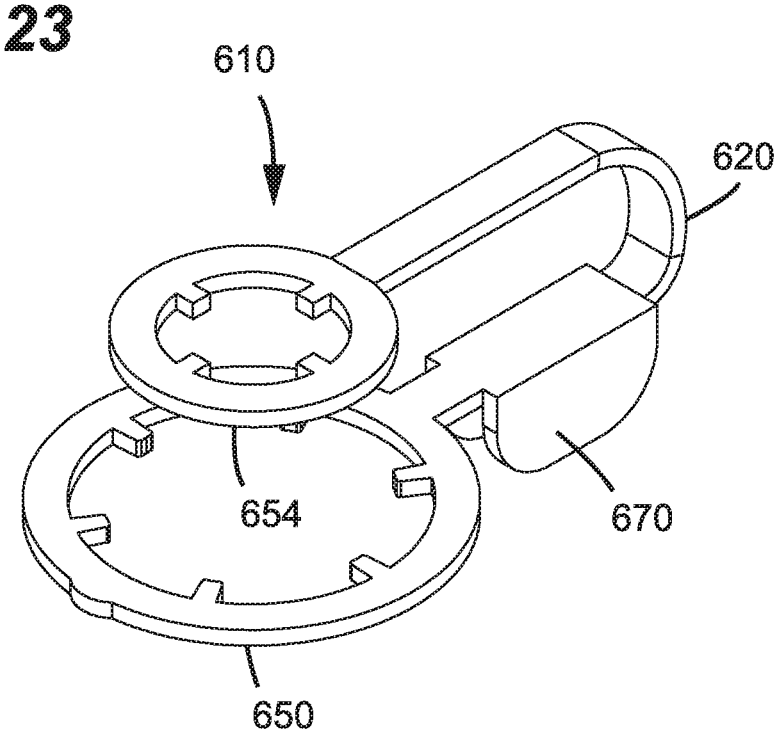
FIG. 23 is a top perspective view of a third alternative embodiment of a lanyard.
Figure 24:
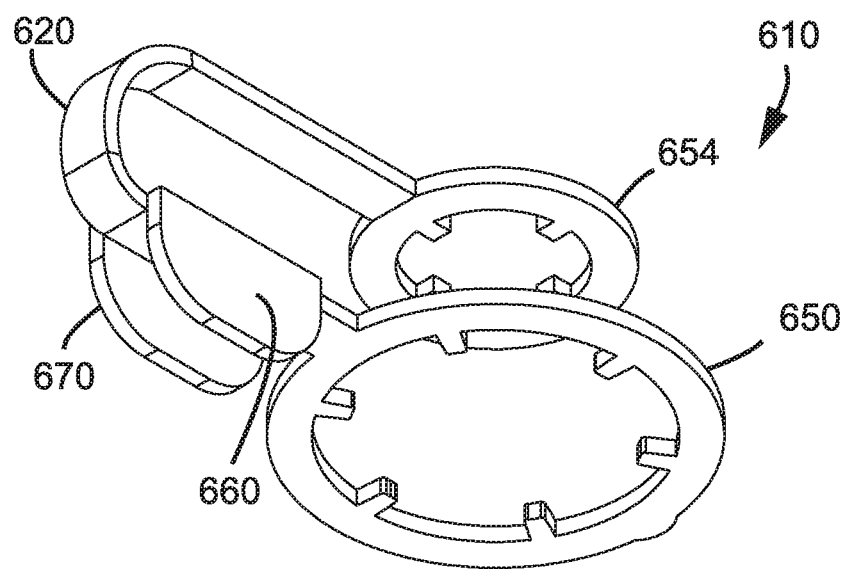
FIG. 24 is a bottom perspective view of the lanyard of FIG. 23.
Figure 25:
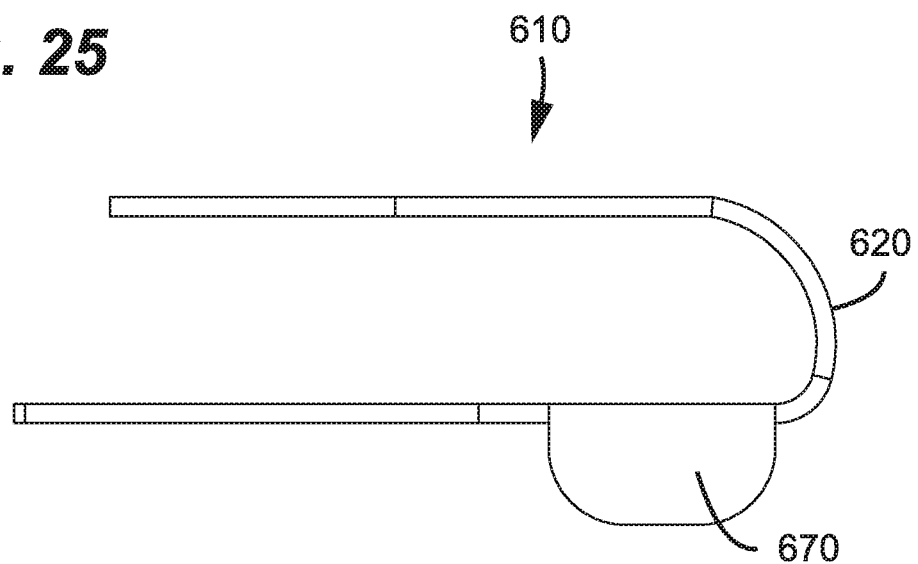
FIG. 25 is a side view of the lanyard of FIG. 23.
Figure 26:
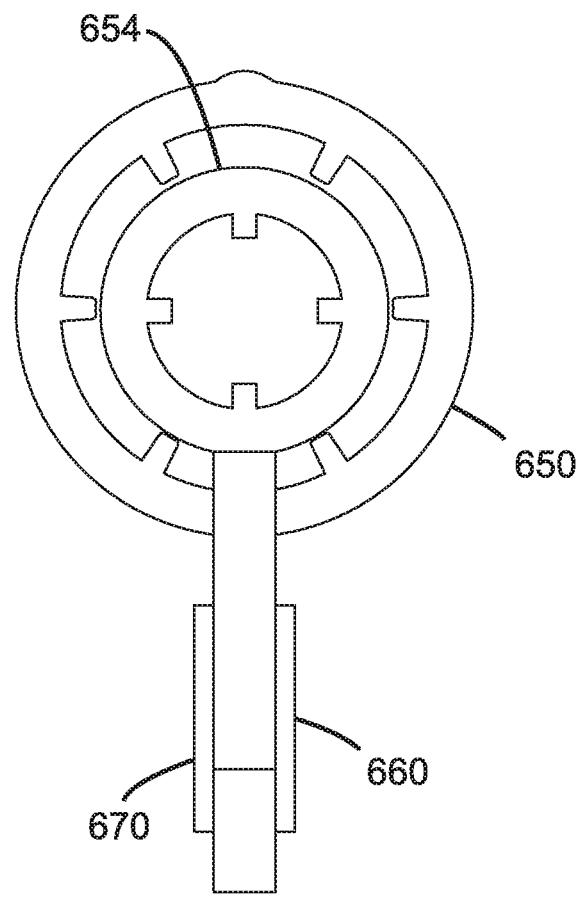
FIG. 26 is a top view of the lanyard of FIG. 23.
Figure 27:
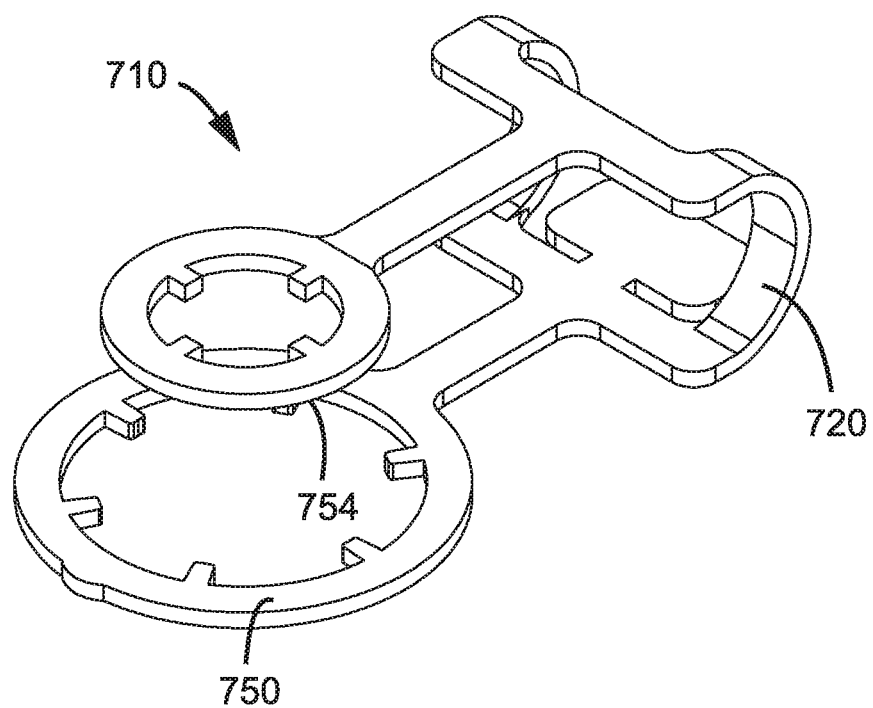
FIG. 27 is a top perspective view of a fourth alternative embodiment of a lanyard.
Figure 28:
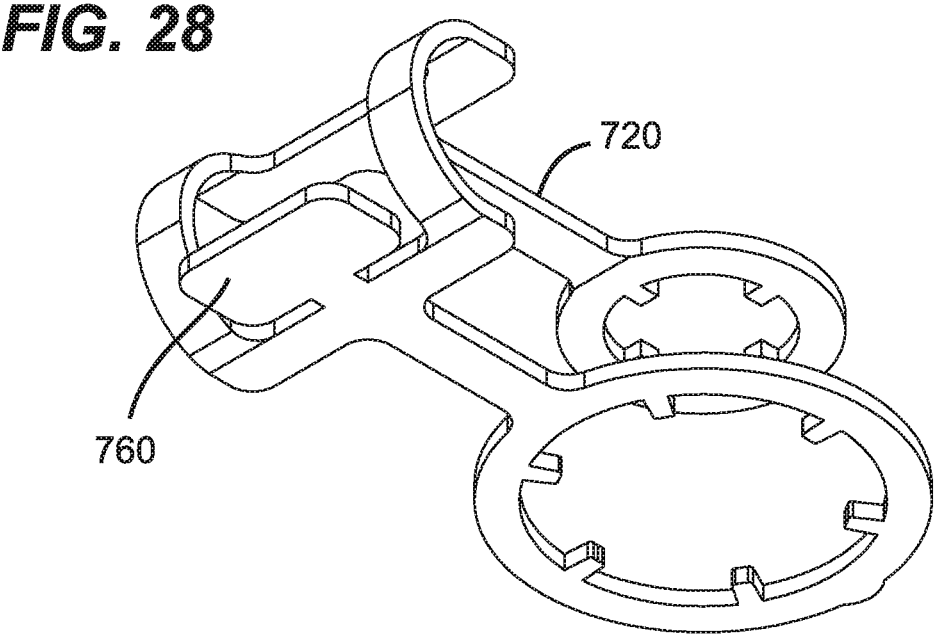
FIG. 28 is a bottom perspective view of a lanyard of FIG. 27.
Figure 29:
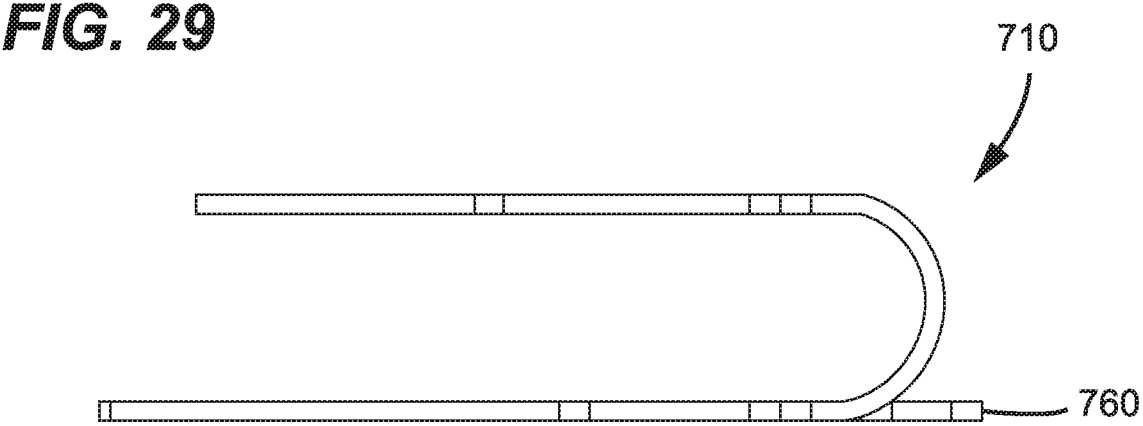
FIG. 29 is a side view of the lanyard of FIG. 27.
Figure 30:
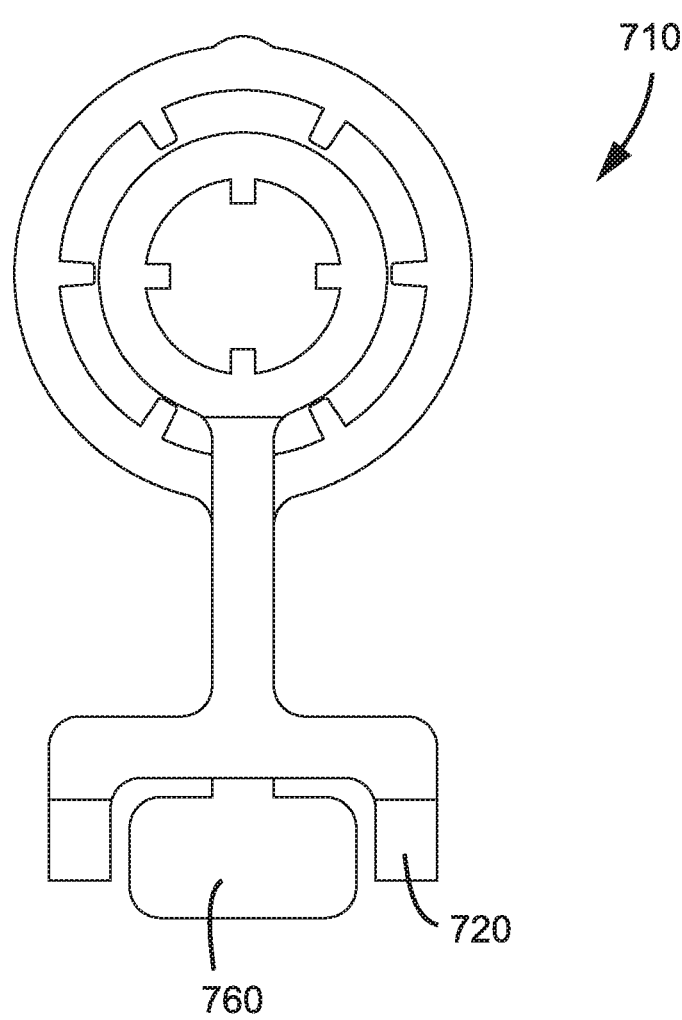
FIG. 30 is a top view of the lanyard of FIG. 27.
Figure 31:
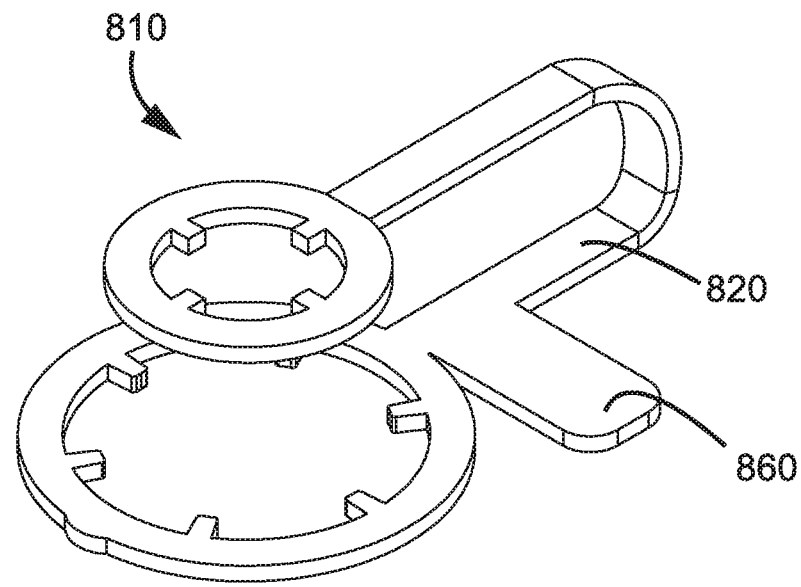
FIG. 31 is a top perspective view of a fifth alternative embodiment of a lanyard.
Figure 32:
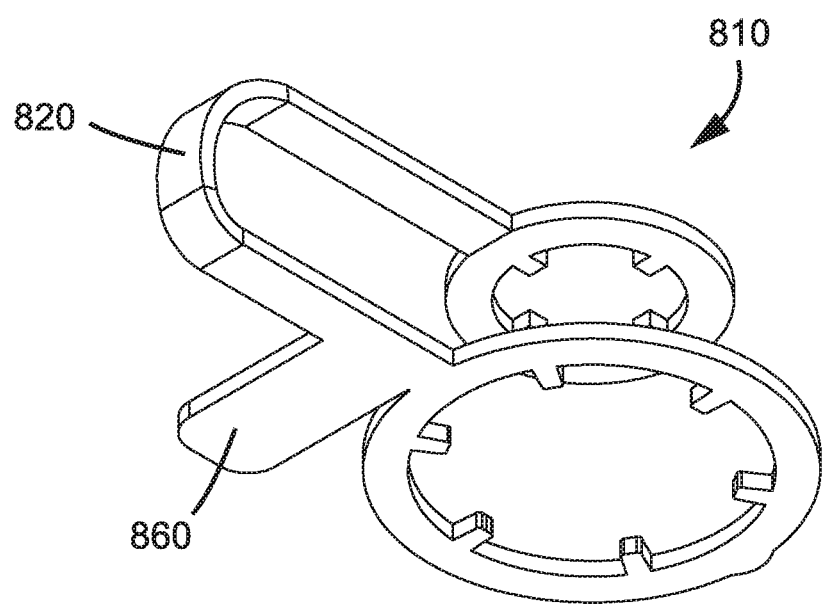
FIG. 32 is a bottom perspective view of the lanyard of FIG. 31.
Figure 33:
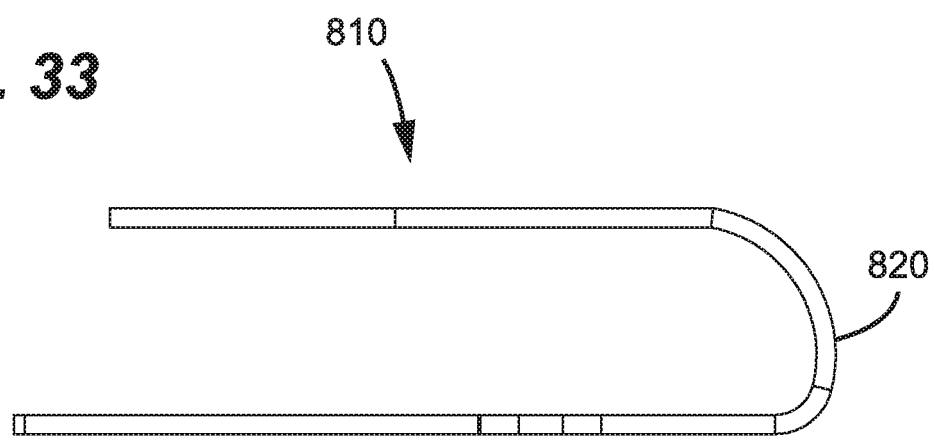
FIG. 33 is a side view of the lanyard of FIG. 31.
Figure 34:
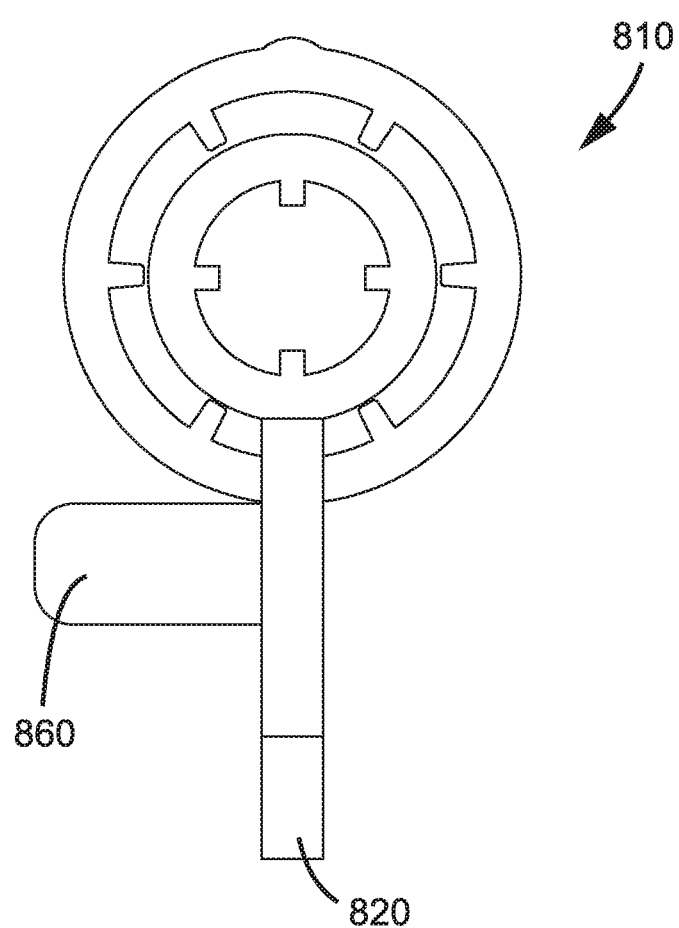
FIG. 34 is a top view of the lanyard of FIG. 31.
Figure 35:
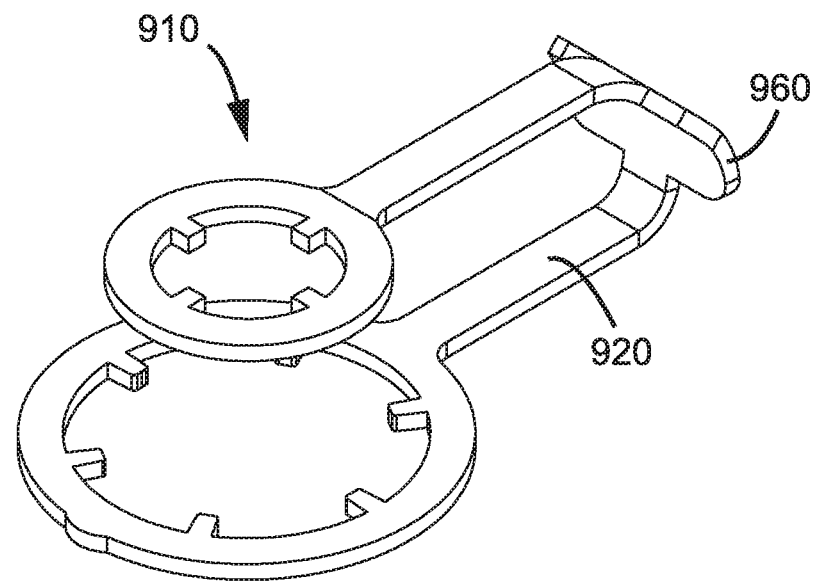
FIG. 35 is a top perspective view of a sixth alternative embodiment of a lanyard.
Figure 36:
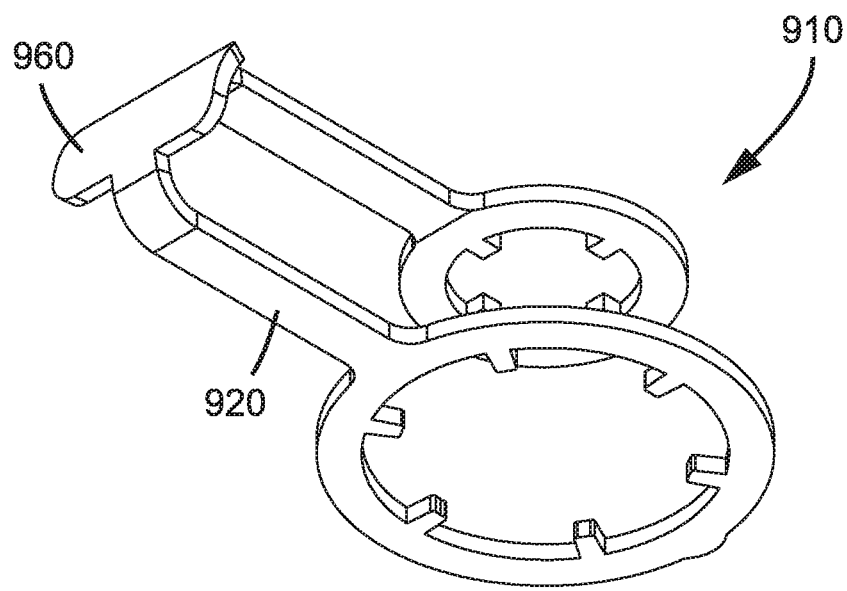
FIG. 36 is a bottom perspective view of the lanyard of FIG. 35.
Figure 37:
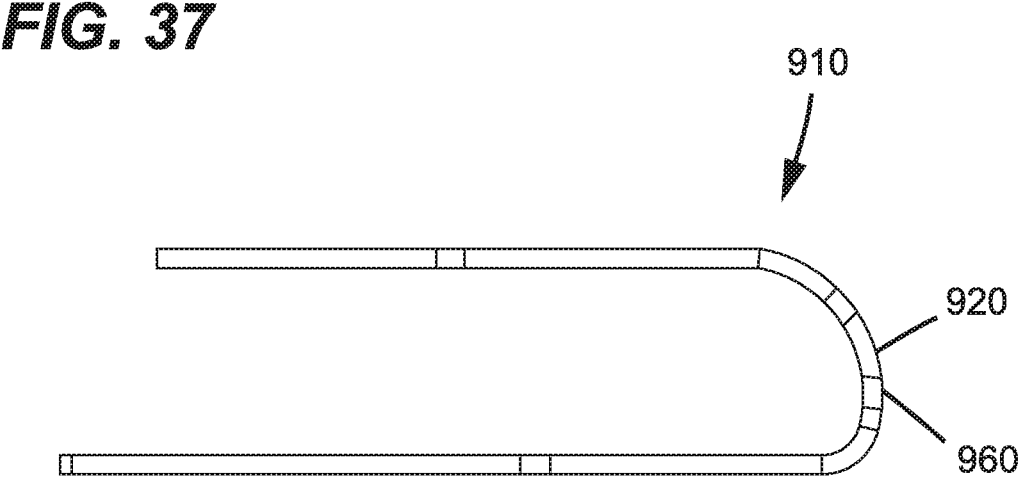
FIG. 37 is a side view of the lanyard of FIG. 35.
Figure 38:
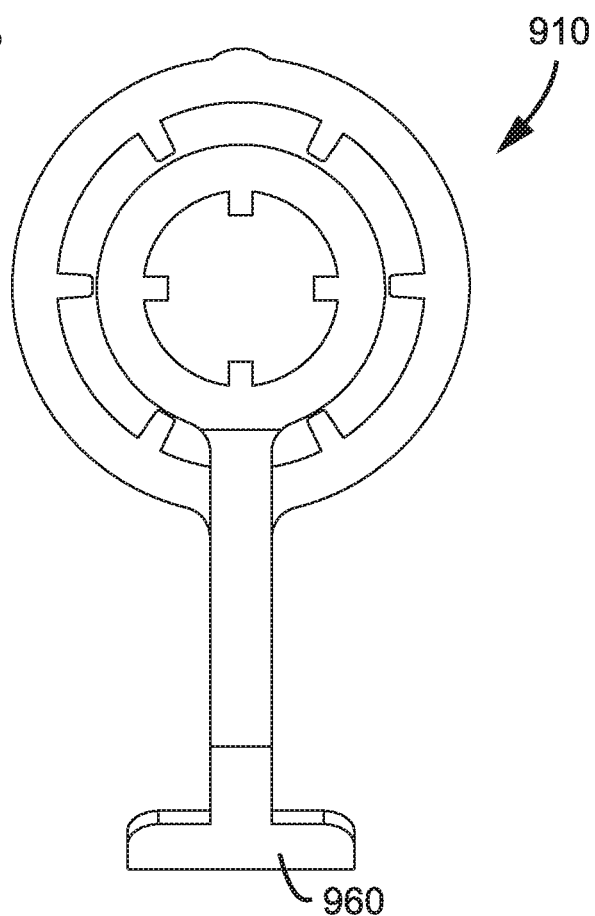
FIG. 38 is a top view of the lanyard of FIG. 35.
Figure 39:
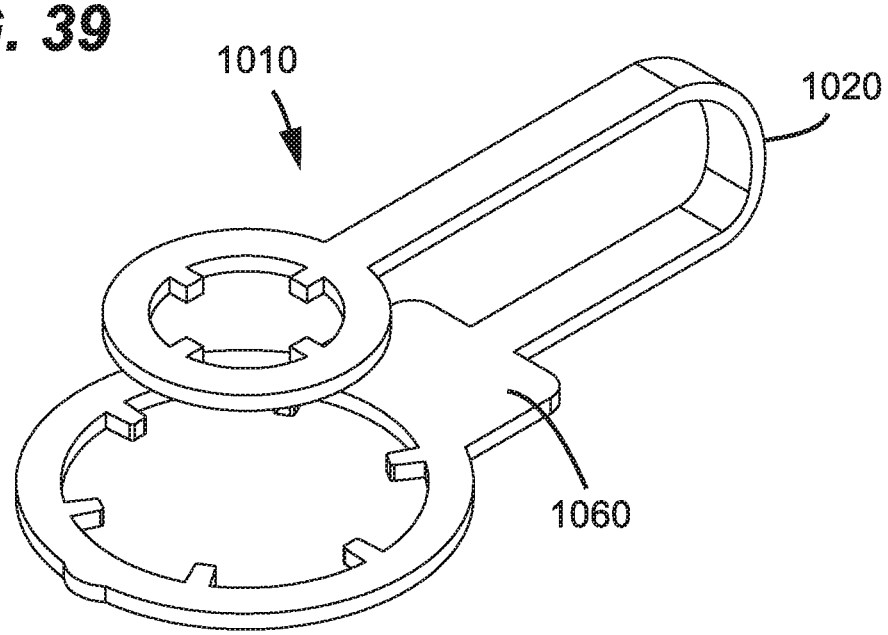
FIG. 39 is a top perspective view of a seventh alternative embodiment of a lanyard.
Figure 40:
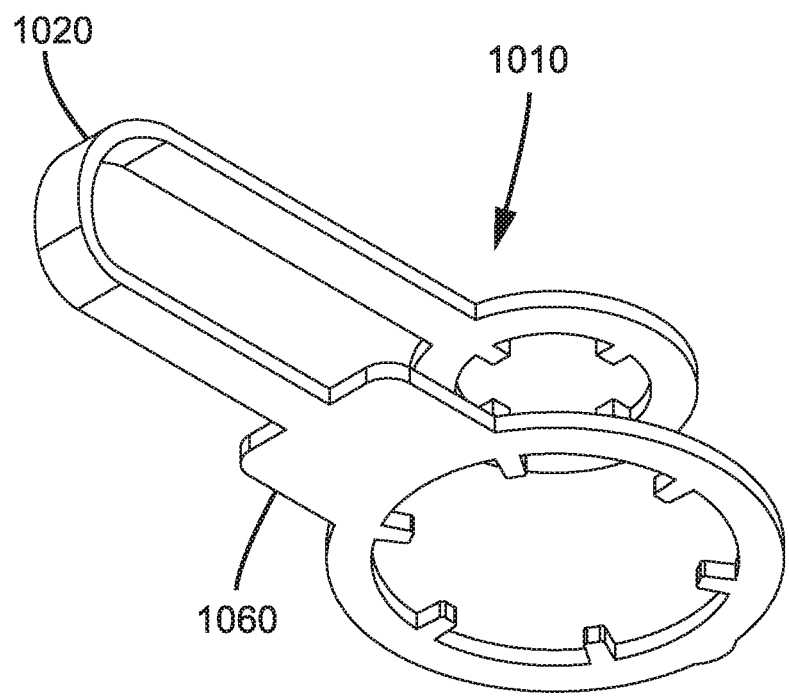
FIG. 40 is a bottom perspective view of the lanyard of FIG. 39.
Figure 41:
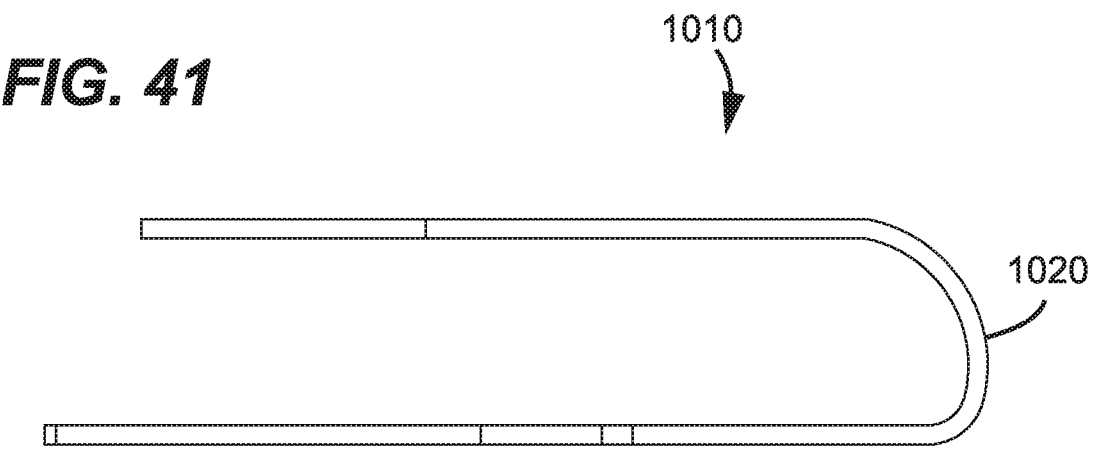
FIG. 41 is a side view of the lanyard of FIG. 39.
Figure 42:
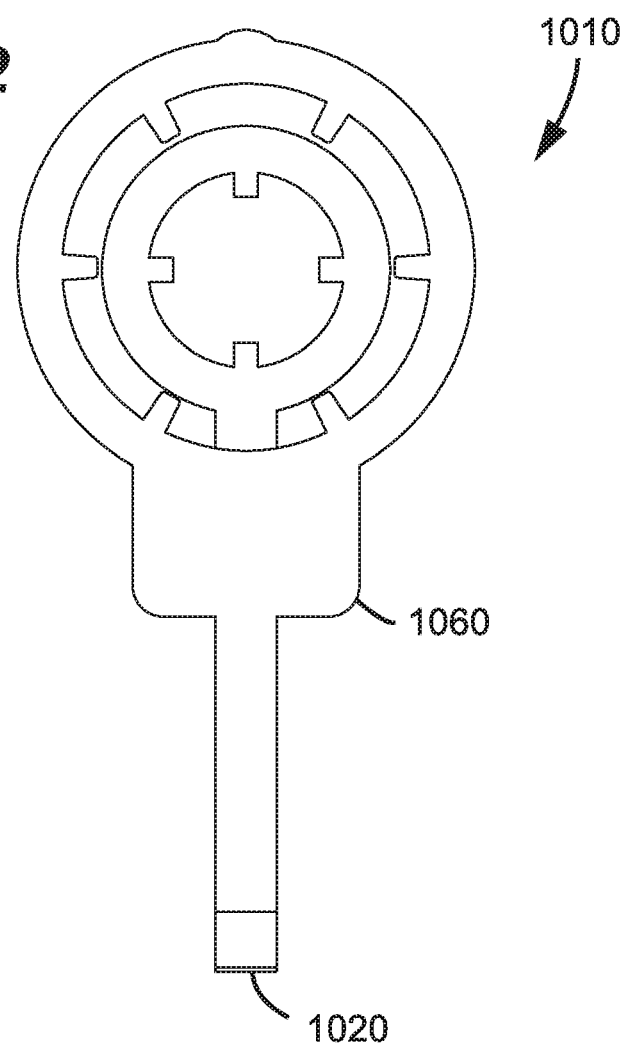
FIG. 42 is a top view of the lanyard of FIG. 39.
Figure 43:
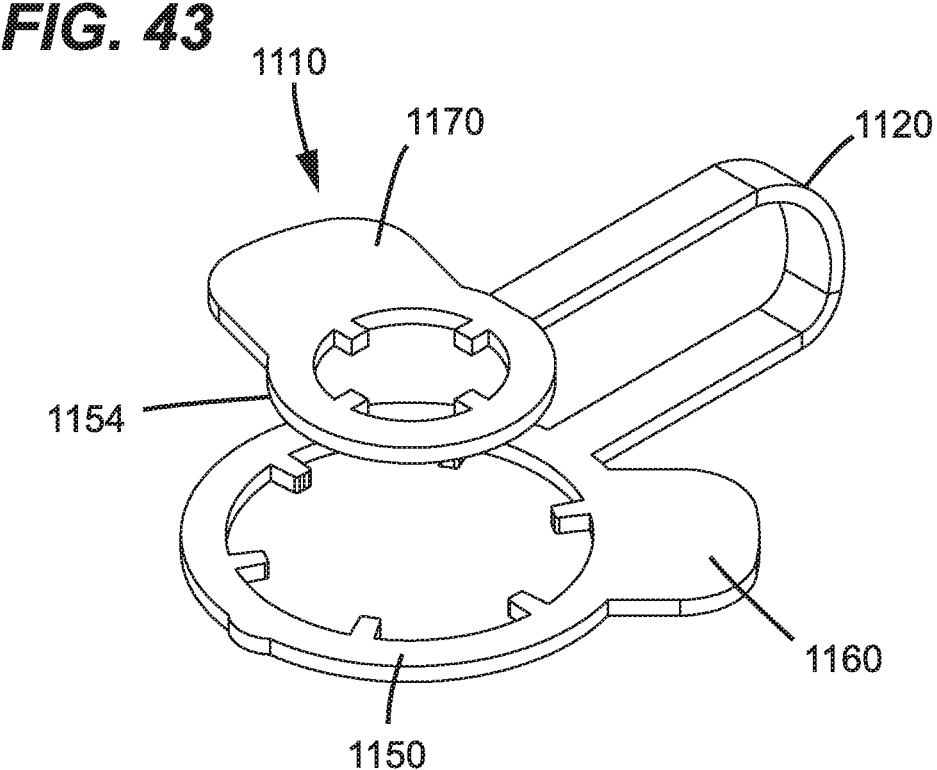
FIG. 43 is a top perspective view of an eighth alternative embodiment of a lanyard.
Figure 44:
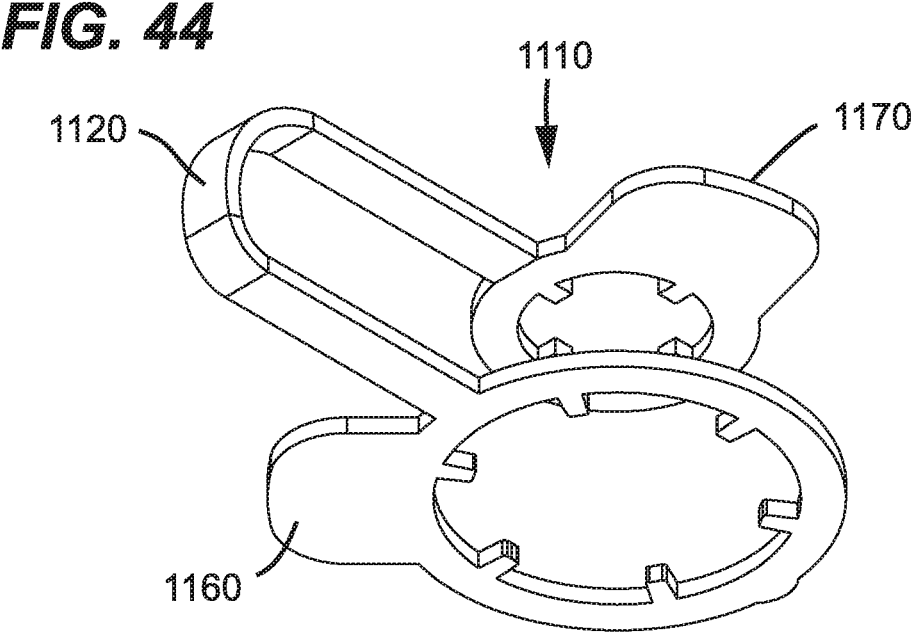
FIG. 44 is a bottom perspective view of the lanyard of FIG. 43.
Figure 45:
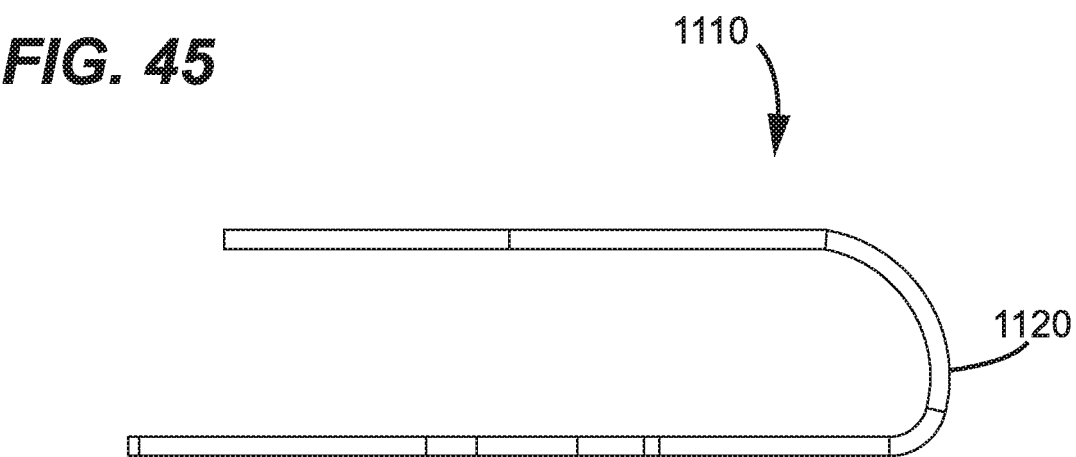
FIG. 45 is a side view of the lanyard of FIG. 43.
Figure 46:
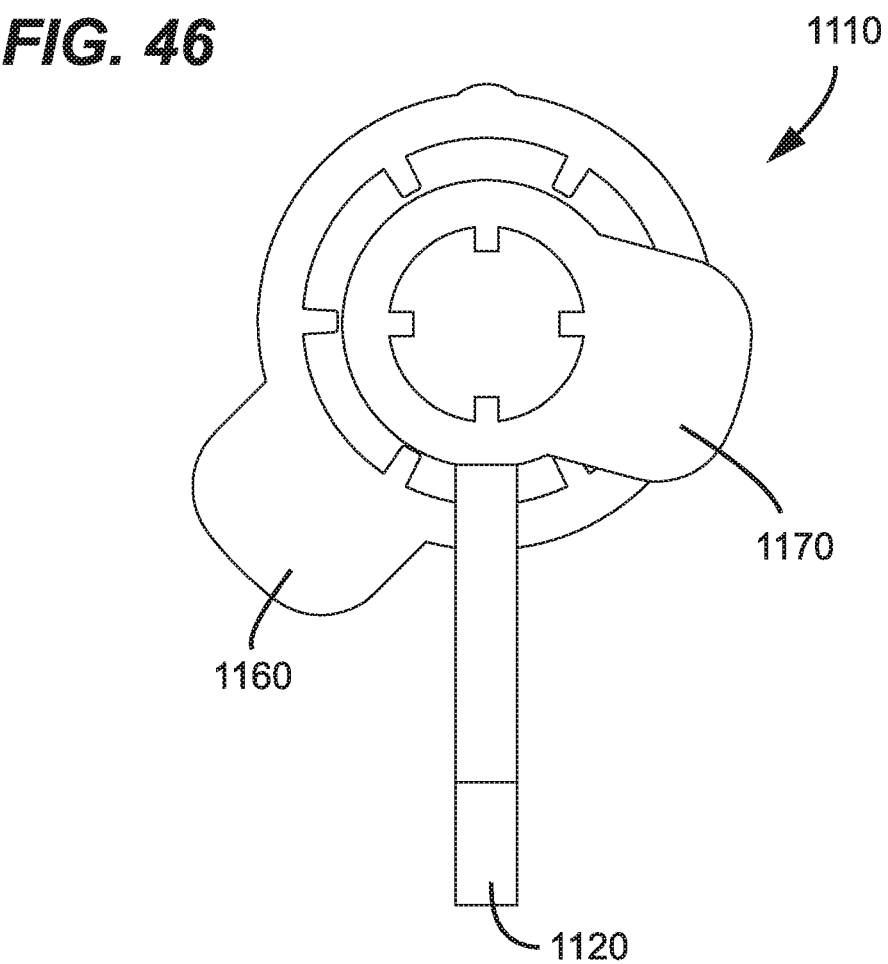
FIG. 46 is a top view of the lanyard of FIG. 43.
Figure 47:
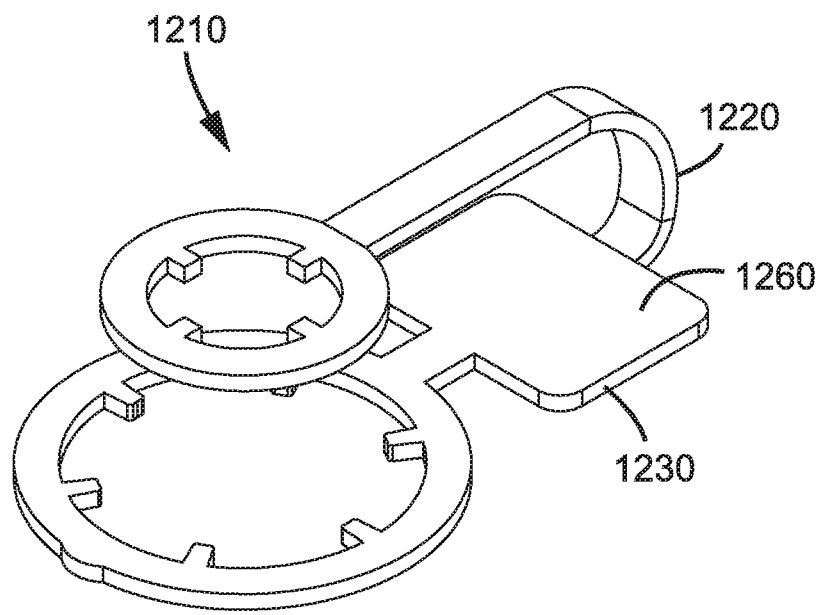
FIG. 47 is a top perspective view of a ninth alternative embodiment of a lanyard.
Figure 48:
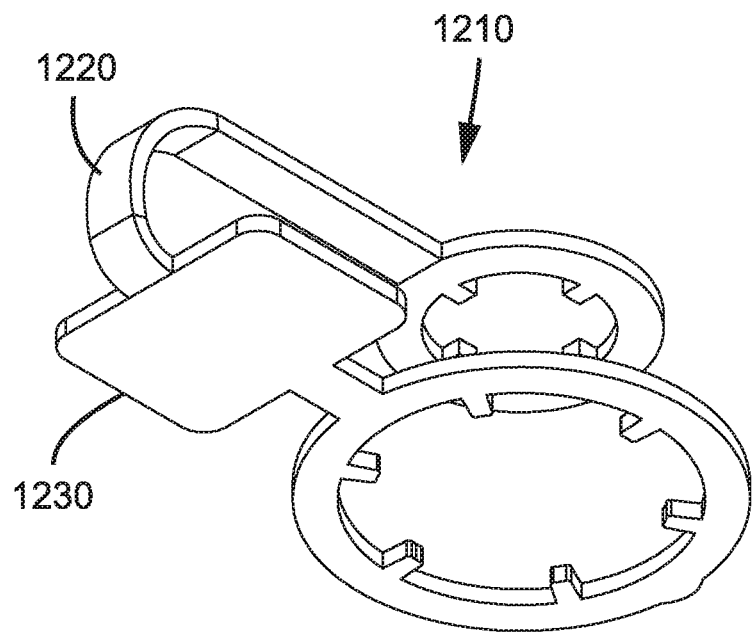
FIG. 48 is a bottom perspective view of the lanyard of FIG. 47.
Figure 49:
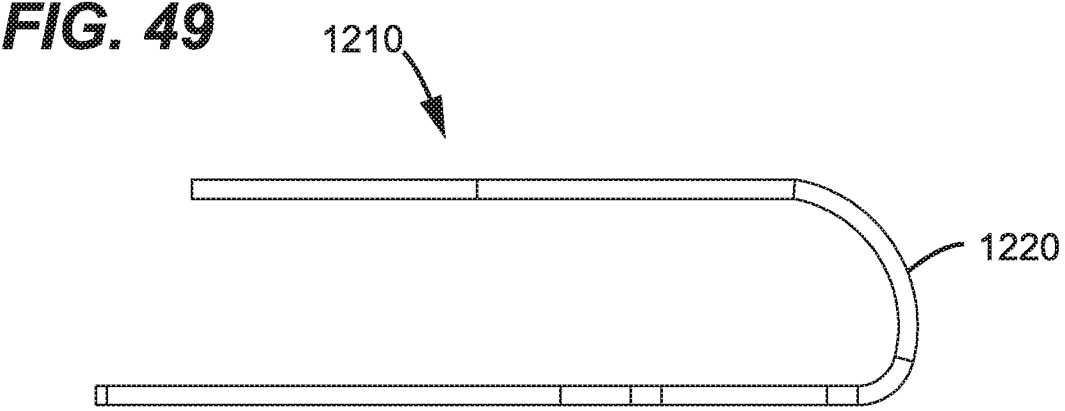
FIG. 49 is a side view of the lanyard of FIG. 47.
Figure 50:
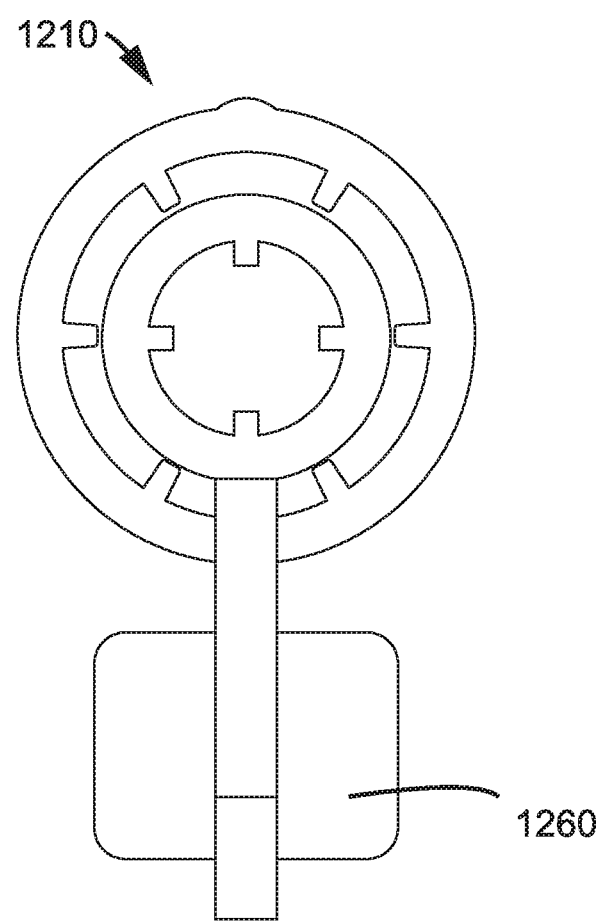
FIG. 50 is a top view of the lanyard of FIG. 47.

FIG. 10 shows in cross-section some internal features of the connector 122 and the internal threads 126 that connect the dust cap 124 to the threads 128 of the connector 122.

Similar part numbering in FIGS. 11-50 follows the part numbering used in FIGS. 1-10. Referring now to FIGS. 11-16, a lanyard 410 is shown including a first end 450 and a second end 454. Both first and second ends 450, 454 are in the shape of loops. In this case, full loops are shown. A strap body or strap portion 420 connects both ends together. Each loop 450, 454 includes internal retention bumps 430 to help retain the respective ends, 450, 454, with the port body 130, and the plug body 140 when the loops are pressed over flanges. Strap portion 420 is flexible and is shown in the position wherein the plug body 140 is positioned in the socket 132 of port body 130. Strap portion 420 is flexible to allow the dust cap to be untwisted and removed from socket 132. Lanyard 410 does not inhibit rotation of the dust cap.

Lanyard 410 includes two identification areas 460, 470 which extend in this example from the respective first end 450 and the second end 454. These identification areas can be used to further distinguish different lanyards or identify ports. For example, the areas can be provided with a stuck on label, printed with ink, imprinted, or written on, such as with a permanent marker. While two identification areas 460, 470 are shown, only one can be provided, if desired.

Referring now to FIGS. 17-22, a different lanyard 510 is shown having a different size, for use with a different mating port body 130 and plug body 140. Similar part numbers are used for similar parts described above, e.g., 520, 550, 554, 560, 570.

Referring now to FIGS. 23-26, a different embodiment of a lanyard 610 includes two identification areas extending in a form of downwardly extending tabs from a strap portion 620. Similar part numbers are used for similar parts described above, e.g., 620, 650, 654, 660, 670.

Referring now to FIGS. 27-30, lanyard 710 includes a dual hinged strap portion 720 and one identification area 760 which is coplanar with first end 750. Similar part numbers are used for similar parts described above, e.g., 720, 750, 754, 760.

Referring now to FIGS. 31-34, lanyard 810 includes an identification area 860 extending at a transverse angle from a strap portion 820.

Referring now to FIGS. 35-38, lanyard 910 includes an identification area 950 at a hinging area of a strap portion 920.

Referring now to FIGS. 39-42, lanyard 1010 with a strap portion 1020 includes a single identification area 1060 similar to lanyard 410.

Referring now to FIGS. 43-46, lanyard 1110 with a includes two identification areas 1160 and 1170 which extend from first and second ends 1150 and 1154 at different angles from one another and at an angle to a strap portion 1120.

Referring now to FIGS. 47-50, lanyard 1210 includes two side tabs 1230 which extend from a strap portion 1220 to form an identification area 1260.

In some cases, the dust cap lanyards can match the colors of the port body and the dust cap. Depending on the user's desires, a matching color can mean an ordinary port or unused port, and the different colors can be assigned to special purpose ports and/or plugs. The lanyards can be changed over time as the port's purpose changes.

In the preferred embodiments, the ports, dust caps and lanyards are used for closing and identifying ports of a hardened terminal. Once the dust cap is removed, the lanyard continues to identify the port by surrounding at least a part of the port.

The identification areas noted above are larger than a small bump, such as a finger tab, that might be useful to remove the lanyard. The identification area should preferably be large enough to provide a surface for legible text, numbers, or symbols, etc., readable by a technician.

The identification area has at least one, and preferably two dimensions larger than a width of the strap portion. See FIG. 11, dimension X, and dimension Y are larger than dimension W.

The identification area has at least one, and preferably two dimensions larger than a width of the loop structures. See FIG. 11, dimension X, and dimension Y are larger than both dimension L1 and dimension L2.

Preferably, the identification areas project from the strap portion, or far enough away from the loop ends so the indicia on the identification areas can be seen when mounted to the port or the dust cap (i.e., the port and dust cap structures do not cover up the indicia).

If two identification areas are provided on the lanyard, preferably, the two areas do not cover each other up when viewed in an axial direction of the port (i.e., the two areas are offset).

If two identification areas are provided, in one embodiment, it is preferred that one be associated with the loop end for the port, and the other one be associated with the loop end for the dust cap.

What is claimed is:

1. A telecommunications closure comprising:
    a body defining a sealed interior for housing fiber optic cables and components;
    a plurality of ports on the body of the closure, wherein the ports include a body that is connected to the closure body and defining an opening for a receipt of a telecommunications connector in a sealed manner;
a plurality of dust caps, each dust cap including a body receivable in one of the port bodies;
a plurality of lanyards connecting one of the port bodies to one of the dust cap bodies;
wherein the dust cap body is sealingly connectable to the respective port body, and wherein the dust cap body is removable from the port body to allow access for a connector body;
wherein all of the port bodies are constructed of a similar color;
wherein all of the dust cap bodies are constructed from a similar color;
wherein at least one of the lanyards has a different color from the port bodies and a different color from the dust cap bodies.

2. The closure of claim 1, wherein at least two of the lanyards have different colors from each other.

3. The closure of claim 1, wherein at least one of the lanyards includes an identification tab defining an identification area extending from a loop of the lanyard, and/or a strap portion of the lanyard.

4. The closure of claim 3, wherein the identification area extends at least partially away from at least one of two loops of the lanyard.

5. The closure of claim 1, wherein two identification areas are included, one of the identification areas associated with a first loop of the lanyard and a second identification area associated with a second loop of the lanyard.

6. The closure of claim 1, wherein all of the port bodies and all of the dust cap bodies are constructed of a similar color.

7. The closure of claim 1, wherein all of the port bodies and all of the dust cap bodies are constructed of a similar molded material.

8. A telecommunications closure comprising:
a body defining a sealed interior for housing fiber optic cables and components;
a plurality of ports on the body of the closure, wherein the ports include a body that is connected to the closure body and defining an opening for a receipt of a telecommunications connector in a sealed manner;
a plurality of dust caps, each dust cap including a body receivable in one of the port bodies;
a plurality of lanyards connecting one of the port bodies to one of the dust cap bodies;
wherein the dust cap body is sealingly connectable to the respective port body, and wherein the dust cap body is removable from the port body to allow access for a connector body;
wherein at least one of the lanyards includes an identification tab extending from either a loop of the lanyard, or a strap portion of the lanyard;
wherein the at least one lanyard includes two of the loops, wherein one of the two loops is positioned around one of the port bodies, and the other of the two loops is positioned around one of the dust cap bodies.

9. The closure of claim 8, wherein the identification area extends at least partially away from at least one of the two loops of the lanyard.

10. The closure of claim 8, wherein two identification areas are included, one of the identification areas associated with a first one of the two loops of the lanyard and a second identification area associated with a second one of the two loops of the lanyard.

11. A telecommunications identification device comprising:
a lanyard including two loops connected by a strap portion, one of the two loops defining a first planar structure with a first main surface and an opposite facing second main surface, and the other of the two loops defining a second planar structure with a third main surface and an opposite facing fourth main surface, each loop of the two loops defining an opening therethrough for receiving structure in the opening;
wherein an identification tab defining an identification area extends from: one of the loops of the lanyard, two of the loops of the lanyard, and/or the strap portion of the lanyard.

12. The device of claim 11, wherein the identification area extends at least partially away from at least one of the two loops of the lanyard parallel to a plane defined by the at least one loop.

13. The device of claim 11, wherein two identification areas are included, one of the identification areas associated with a first one of the loops of the lanyard and a second identification area associated with a second loop of the lanyard.

14. The device of claim 13, wherein one of the identification areas associated with a first one of the loops of the lanyard extends along the strap portion, and a second identification area associated with a second loop of the lanyard extends away from a center of the second loop and is spaced from the strap portion.

15. The device of claim 13, wherein one of the identification areas associated with a first one of the loops of the lanyard and a second identification area associated with a second loop of the lanyard are both at least partially visible when viewed along an axis of each loop when the axis of each loop are co-linear.

16. The device of claim 11, wherein the identification area extends at least partially away from the strap portion and is not extending from either of the two loops of the lanyard.

17. The device of claim 11, wherein the identification area associated with a first one of the loops of the lanyard extends along the strap portion to form a wider portion than a further extending strap portion.

18. The device of claim 11, wherein two identification tabs are provided, wherein each identification tab extends from: one of the loops of the lanyard, two of the loops of the lanyard, and/or the strap portion of the lanyard.

19. The closure of claim 8, wherein each of the lanyards includes two of the loops, wherein one of the two loops of each lanyard is positioned around one of the port bodies, and the other of the two loops of each lanyard is positioned around one of the dust cap bodies.

20. The closure of claim 19, wherein each loop of each lanyard includes a plurality of internal retention bumps.

21. The device of claim 11, wherein the two loops each include a plurality of internal retention bumps.

* * * * *